(12) United States Patent
Lee et al.

(10) Patent No.: US 7,903,653 B2
(45) Date of Patent: Mar. 8, 2011

(54) BROADCAST LATENCY OPTIMIZATION IN MULTIHOP WIRELESS NETWORKS

(75) Inventors: Seungjoon Lee, Springfield, NJ (US); Rajiv Gandhi, Camden, NJ (US); Yoo-Ah Kim, Storrs, CT (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 98 days.

(21) Appl. No.: 12/335,727

(22) Filed: Dec. 16, 2008

(65) Prior Publication Data
US 2010/0149983 A1 Jun. 17, 2010

(51) Int. Cl.
*H04L 12/28* (2006.01)
(52) U.S. Cl. .......................................... 370/390
(58) Field of Classification Search .................. 370/310, 370/312, 315, 316, 326, 328, 329, 336, 337, 370/431, 432, 442, 445, 447, 448, 458, 461, 370/351, 389, 395.1, 395.4, 229, 235, 237, 370/390
See application file for complete search history.

(56) References Cited

U.S. PATENT DOCUMENTS

| | | | | |
|---|---|---|---|---|
| 5,926,101 | A * | 7/1999 | Dasgupta | 340/825.02 |
| 2003/0174701 | A1 * | 9/2003 | Angle et al. | 370/390 |
| 2008/0013501 | A1 * | 1/2008 | Keshavarzian et al. | 370/338 |
| 2009/0147723 | A1 * | 6/2009 | Fang et al. | 370/315 |

OTHER PUBLICATIONS

C. Ho, K. Obraczka, G. Tsudik, and K. Viswanath, "Flooding for reliable multicast in multi-hop ad hoc networks," in Proc. of the Int. Work. on Disc. Alg. and Meth. for Mobile Comp. and Comm., 1999, pp. 64-71. http://citeseerx.ist.psu.ed/viewdoc/summary?doi=10.1.1.22.7204. Last accessed on Mar. 9, 2009_pages.
J. Jetcheva, Y. Hu, D. Maltz, and D. Johnson, "A simple protocol for multicast and broadcast in mobile ad hoc networks," Jul. 2001.

(Continued)

*Primary Examiner* — Kwang B Yao
*Assistant Examiner* — Obaidul Huq

(57) ABSTRACT

A system and methodology that can optimize practical performance by reducing broadcast latency and collisions in a multihop wireless network is provided. The system includes an optimization component that determines a schedule for transmitting and/or receiving messages at nodes in the network during one-to-all broadcasting, all-to-all broadcasting, and/or all-to-one collection. The schedule enables each node in wireless network to participate in broadcasting as soon as possible, such that, when a node transmits a message to its parent to deliver the message to a source node, the children of the node also receive the message and initiate broadcasting the message in their subtrees in parallel. Further, during data collection, the schedule for messages to be transmitted to a sink node is determined based in part on a priority associated with the message. Additionally, the generated schedule does not affect a set of theoretical bounds associated with a broadcast algorithm employed by the network.

20 Claims, 12 Drawing Sheets

OTHER PUBLICATIONS

S.-Y. Ni, Y.-C. Tseng, Y.-S. Chen, and J.-P. Sheu, "The broadcast storm problem in a mobile ad hoc network," in Proc. of the 5th Ann. ACM/IEEE Int. Conf. on Mobile Comp. and Net., 1999, pp. 151-162.

R. Gandhi, S. Parthasarathy, and A. Mishra, "Minimizing broadcast latency and redundancy in ad hoc networks," in Proceedings of the 4th ACM Interational Symposium on Mobile Ad Hoc Networking and Computing, MobiHoc 2003, 2003, pp. 222-232. http://www.sigmobile.org/mobihoc/2003/papers/p222-gandhi.pdf. Last accessed on Mar. 9, 2009, 11 pages. S. C.-H. Huang, P.-J. Wan, C. T. Vu, Y. Li, and F. F. Yao, "Nearly constant approximation for data aggregation scheduling in wireless sensor networks," in INFOCOM, 2007, pp. 366-372. http://www.cs.gsu.edu/~cscysl/papers/infocom07.pdf. Last accessed on Mar. 9, 2009, 7 pages.

V. Annamalai, S. Gupta, and L. Schwiebert, "On tree-based convergecasting in wireless sensor networks," in IEEE Wireless Communications and Networking, 2003. [Online]. Available: citeseer.ist.psu.edu/annamalai03treebased.html http://ieeexplore.ieee.org/stamp/stamp.jsp?arnumber=1200684&isnumber=27030. Last accessed on Mar. 9, 2009, 6 pages.

S. Huang, P. Wan, X. Jia, H. Du, and W. Shang, "Minimum-latency broadcast scheduling in wireless ad hoc networks," in Proceedings of the 26th IEEE Interational Conference on Computer Communications, INFOCOM 2007, 2007, pp. 733-739. http://ieeexplore.ieee.org/stamp/stamp.jsp?arnumber=4215673&isnumber=4215582. Last accessed on Mar. 9, 2009, 7.

H. Lim and C. Kim, "Multicast tree construction and flooding in wireless ad hoc networks," in Proc. of the 3rd ACM Int. Workshop on Modeling, Analysis and Simulation of Wireless and Mobile Sys, 2000, pp. 61-68. http://delivery.acm.org/10.1145/350000/346865/p61-lim.pdf?key1=346865&key2=4927066321&coll=GUIDE&dl=GUIDE&CFID=25927695&CFTOKEN=98922399. Last accessed.

W. Peng and X.-C. Lu, "On the reduction of broadcast redundancy in mobile adhoc networks," in Proceedings of First Annual Workshop on Mobile Ad Hoc Networking Computing. MobiHOC, Aug. 11, 2000. http://delivery.acm.org/10.1145/520000/514171/p129-peng.pdf?key1=514171&key2=5767066321&coll=GUIDE&dl=GUIDE&CFID=25928371&CFTOKEN=64486354. Last accessed.

A. Qayyum, L. Viennot, and A. Laouiti, "Multipoint relaying: An efficient technique for flooding in mobile wireless networks," INRIA, Tech. Rep. Research Report RR-3898, Feb. 2000. http://hal.inria.fr/docs/00/07/27/56/PDF/RR-3898.pdf. Last accessed on Mar. 9, 2009, 19 pages.

W. Peng and X. Lu, "Ahbp: An efficient broadcast protocol for mobile adhoc networks," J. of Science and Tech.—Beijing, China, 2000.

J. Sucec and I. Marsic, "An efficient distributed network-wide broadcast algorithm for mobile adhoc networks," Rutgers U., Tech. Rep., 2000. http://citeseerx.ist.psu.edu/viewdoc/summary?doi=10.1.1.35.2683. Last accessed on Mar. 9, 2009, 11 pages.

W. Peng and X. Lu, "Efficient broadcast in mobile ad hoc networks using connected dominating sets," J. Of Software—Beijing, China, 1999. www.jos.org.cn/ch/reader/download_pdf.aspx?file_no=20010407&year_id=2001&quarter_id=4&falg=1. Last accessed on Mar. 9, 2009, 8 pages.

I. Stojmenovic, M. Seddigh, and J. Zunic, "Dominating sets and neighbor elimination-based broadcasting algorithms in wireless networks," IEEE Trans. on Parallel and Distributed Systems, pp. 14-25, Jan. 2002. http://ieeexplore.ieee.org/ielx5/71/21109/00980024.pdf?arnumber=980024. Last accessed on Mar. 9, 2009, 12 pages.

L. Orecchia, A. Panconesi, C. Petrioli, and A. Vitaletti, "Localized techniques for broadcasting in wireless sensor networks," in DIALMPOMC '04: Proceedings of the 2004 joint workshop on Foundations of mobile computing, New York, NY, USA, 2004, pp. 41-45 1. http://www.eecs.berkeley.edu/~orecchia/pubs/dialM.pdf. Last accessed on Mar. 9, 2009, 11 pages.

H. F. Salama, D. S. Reeves, and Y. Viniotis, "The delay-constrained minimum spanning tree problem," in Second IEEE Symp. on Comp. and Comm. IEEE Computer Society, 1997, pp. 699-704. http://ieeexplore.ieee.org/stamp/stamp.jsp?arnumber=616089&isnumber=13414. Last accessed on Mar. 9, 2009, 5 pages.

I. Chlamtac and S. Kutten, "On broadcasting in radio networks—problem analysis and protocol design," IEEE Trans. on Comm., vol. 33, No. 12, pp. 1240-1246, 1985. http://ieeexplore.ieee.org/stamp/stamp.jsp?arnumber=1096245&isnumber=23991. Last accessed on Mar. 9, 2009, 7 pages.

Imrich Chilamtac and Shay Kutten, "Tree-based broadcasting in multihop radio networks," IEEE Trans. on Comp., vol. 36, No. 10, pp. 1209-1223, 1987. http://citeseerx.ist.psu.edu/viewdoc/summary?doi=10.1.1.13.8931. Last accessed on Mar. 9, 2009, 15 pages.

S. Basagni, I. Chlamtac, and D. Bruschi, "A mobility-transparent deterministic broadcast mechanism for ad hoc networks," IEEE/ACM Trans. on Networking (TON), vol. 7, No. 6, pp. 799-807, 1999. http://ieeexplore.ieee.org/stamp/stamp.jsp?arnumber=00811446. Last accessed on Mar. 9, 2009, 9 pages.

Z. Chen, C. Qiao, J. Xu, and T. Lee, "A constant approximation algorithm for interference aware broadcast in wireless networks," in Proceedings of the 26th IEEE International Conference on Computer Communications, INFOCOM 2007, 2007, pp. 740-748. http://ieeexplore.ieee.org/stamp/stamp.jsp?arnumber=4215674&isnumber=4215582. Last accessed on Mar. 9, 2009, 9.

P.-K. Hung, J.-P. Sheu, and C.-S. Hsu, "Scheduling of broadcasts in multihop wireless networks," in European Wireless, 2002. http://www2.ing.unipi.it/ew2002/proceedings/086.pdf. Last accessed on Mar. 9, 2009, 7 pages.

B. Williams and T. Camp, "Comparison of broadcasting techniques for mobile ad hoc networks," in Proc. of the 3rdACMInt. Symp. on Mobile Ad hoc Net. and Comp., 2002, pp. 194-205. http://www.cs.jhu.edu/~dholmer/600.647/papers/Comparison%20of%20Broadcasting%20Techniques%20-%20Mobihoc%202002.pdf. Last accessed on Mar. 9, 2009, 16 pages.

P. Bateman and P. Erd os, "Geometrical extrema suggested by a lemma of besicovitch," The American Mathematical Monthly, pp. 306-314, May 1951. http://www.renyi.hu/~p_erdos/1951-03.pdf. Last accessed on Mar. 9, 2009, 9 pages.

* cited by examiner

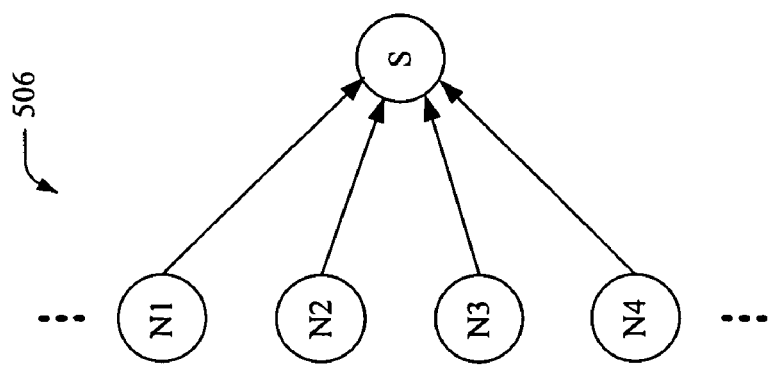
FIG. 5C
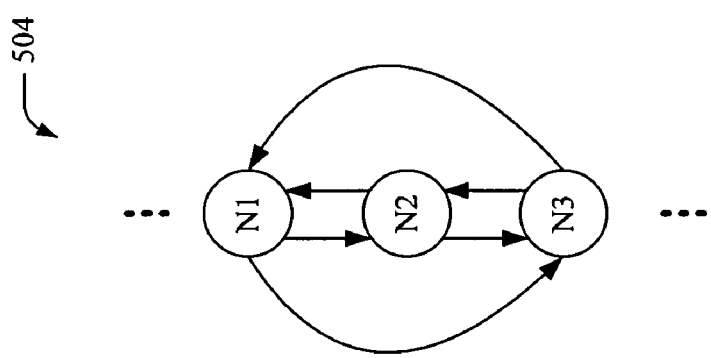
FIG. 5B
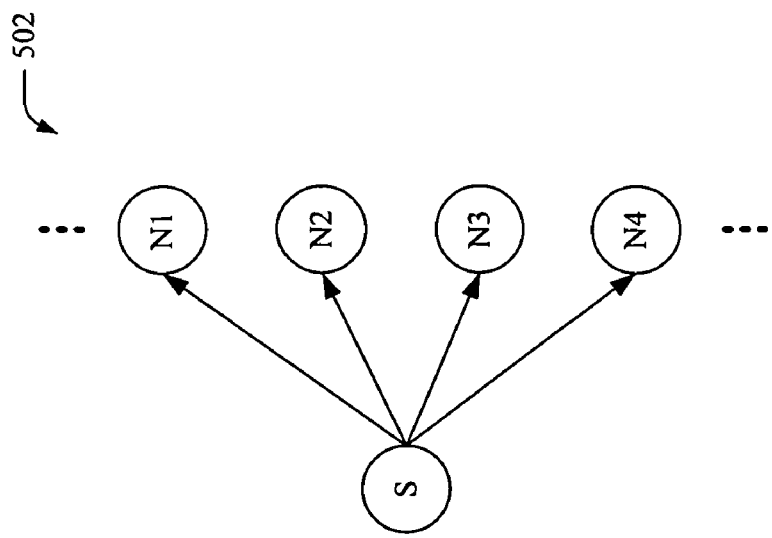
FIG. 5A
FIG. 5

BROADCAST LATENCY OPTIMIZATION IN MULTIHOP WIRELESS NETWORKS

BACKGROUND

Network-wide data broadcast and data collection are fundamental operations in wireless networks. The goal of broadcasting is to transmit a message from a source to all the other nodes in the network. Several network protocols rely on broadcasting, for example, information dissemination, service/resource discovery, or routing in multihop wireless networks. Given that key applications of multihop wireless networks include disaster relief and rescue operations, military communication, and prompt object detection using sensors, the design of low-latency broadcasting scheme is essential to meeting stringent end-to-end delay requirements for higher-level applications. Typically, a data collection problem arises when data is gathered from wireless nodes to a fixed sink to process the data that can lead to related problems such as data aggregation or convergecast Due to the property of wireless medium, interference is a fundamental limiting factor in wireless networks. When two or more nodes transmit a message to a common neighbor at the same time, collision occurs at the common node and the common node does not receive any of these messages. One of the earliest broadcast mechanisms employed is flooding, wherein every node in the network transmits a message to its neighbors after receiving it. Although flooding is extremely simple and easy to implement, flooding can be very costly and can lead to serious redundancy, bandwidth contention, and collision: a situation known as broadcast storm.

A few conventional systems present a mobility transparent broadcast scheme for mobile multi-hop radio networks, wherein, nodes compute their transmit times once in the beginning of transmission. Conventional systems also provide schemes with bounded latency, which have approximation factors that are linear and polylogarithmic in the number of network nodes. In effect, the schemes assume that the topology of the network is completely unknown. Although the schemes are attractive for highly mobile environments, their approximation factors are far from what is achievable in static and relatively less mobile environments.

Some other traditional systems prove that minimizing broadcast latency in wireless networks is NP-complete. The algorithm employed by these traditional systems, simultaneously achieves a constant approximation both for the latency as well as for the number of transmissions. However, the constant for the latency of their one-to-all algorithm is high. Further, a few systems provide centralized and distributed algorithms for broadcasting and experimentally study of their algorithms with respect to collision-free delivery, number of transmissions and broadcast latency. However, the distributed algorithm is not guaranteed to be collision-free and guarantees are not provided with respect to the number of transmissions and latency of the broadcast schedule.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

The systems and methods disclosed herein, in one aspect thereof, can facilitate improving practical performance of broadcast scheduling systems in multihop wireless networks. The system can determine a schedule for message transmissions during broadcast and/or collection that can minimize latency without affecting theoretical bounds associated with an algorithm employed by the broadcasting systems. Specifically, the schedule occasionally prevents nodes in the network from relaying a broadcast packet while they can do so. Further, the schedule enables nodes to participate in the broadcast as soon as possible, such that, they are not idle for long periods of time and thus reduce latency.

In accordance with an aspect of the system, an optimization component can be employed to generate a schedule for a broadcast scheme associated with a wireless network that can reduce latency without affecting a theoretical worst-case bound associated with a broadcast algorithm. The schedule can be generated based on data from a broadcast tree associated with the network. Moreover, the optimization component can determine a schedule that can specify, for each message j and each node i, a time at which node i can receive message j collision-free and a time at which node i can transmit message j.

According to another aspect, a tree construction component can facilitate construction of a broadcast tree based on network data. The tree can be a breadth first search (BFS) tree that can be rooted at a node s. Node s can be a source node in one-to-all broadcasting, a sink node in all-to-one collection and can be most any node in the network during all-to-all broadcast, such that, node s generates a broadcast tree with a minimum depth. Further, the tree construction component can build the broadcast tree in a manner, such that, when a node u is a child of node v in the broadcast tree, then node u is responsible for relaying all messages received from its subtree to node v collision free, and node v is responsible for sending remaining messages to the node u.

Another aspect of the subject innovation comprises a scheduling component that determines an order of message transmissions based on the broadcast scheme and network data. Typically, the scheduling component can schedule transmissions in two phases during one-to-all broadcast. During a first phase, the scheduling component can schedule transmissions only to a set X of primary nodes and non-leaf secondary nodes in the broadcast tree. Further, during a second phase, the scheduling component can schedule transmissions to send the message to the other nodes in the network excluded from set X. Thus, the scheduling component can specify the transmit times of each node at most twice, once in each phase According to still another aspect of the system, the scheduling component can reduce latency during all-to-all broadcast by introducing a superstep, wherein each node can transmit at most one message when there exists a message that the node has received but not sent. The scheduling component can determine an order of transmissions for all-to-all broadcast by employing the following rules: (Rule 1) considering primary nodes first and then scheduling secondary nodes; (Rule 2) considering primary nodes in a non-increasing order of their degrees in $G^2$ [P], wherein, $G^2$ can be a graph where there is an edge between node u and v if their distance in G is at most 2 and $G^2$ [P] can be the induced subgraph of $G^2$ by primary nodes; and, (Rule 3) scheduling secondary nodes, such that, the nodes can be considered in the order of their depth in $T_b$ (e.g. considering the root node first). Further, the scheduling component can determine an order in which each node can perform either upward or downward transmissions.

In accordance with another aspect of the subject disclosure, the scheduling component can determine a transmission schedule that optimizes practical performance during one-to-all collection. In particular, the scheduling component can employ a sorted list of messages and schedule transmissions by utilizing a greedy approach, such that latency can be minimized. Typically, messages that originate from nodes that are closer to a sink node can appear first in the sorted list. The scheduling component can schedule transmissions based on an order of messages in the sorted list. Thus, the latency in all-to-one data collection can be reduced without affecting a theoretical bound associated with a broadcast algorithm, by arranging the messages based on a priority, and scheduling the transmissions of the messages based on the arrangement.

Yet another aspect of the disclosed subject matter relates to a method that can be employed to minimize broadcast latency and optimize practical performance of a network without affecting theoretical bounds of the broadcast algorithm employed by the network. The method comprises construction of a broadcast tree based in part on the network data and/or a broadcast scheme. In one aspect, the broadcast tree can be utilized in a manner to prevent collisions at a node in the network. Further, a broadcast schedule for transmission of messages at each node in the network can be determined, such that, latency, redundancy and/or collisions in the network can be reduced without affecting a theoretical worst case bound.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

FIGS. 5A-5C illustrate example schematic diagrams of various broadcast schemes in accordance with the subject innovation.

DETAILED DESCRIPTION

Figure 1:
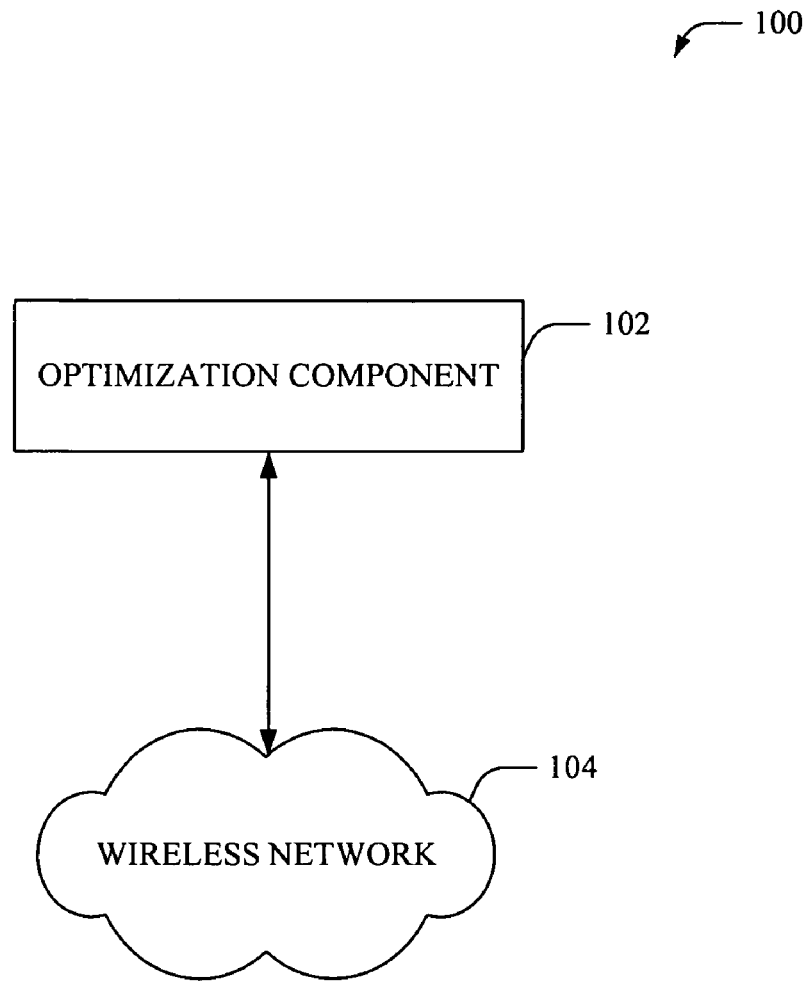
FIG. 1 illustrates an example system that can facilitate improvement in practical performance of a wireless broadcast system, according to an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the term "node" employed herein, is typically intended to refer to most any communication device that can be mobile, stationary, and/or have limited mobility. As an example, a mobile device can include, but is not limited to, a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem, a laptop, a media player, a media recorder, a camera, etc., or a combination thereof. Further, a stationary communication device can include, but is not limited to, a personal computer, desktop connected to an internal and/or external wireless modem, base station, etc.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips ... ), optical disks (e.g., compact disk (CD), digital versatile disk (DVD) ... ), smart cards, and flash memory devices (e.g., card, stick, key drive ... ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In addition, the following notations are employed herein unless specified otherwise:

$T_b$—broadcast tree
$V_f$—nodes that have not received all messages
$X$—nodes that have children in $T_b$
$Rcv(v)$—messages that node v has received
$dRcv(v)$—true if v received a message in $M(v)$ in a superstep
$Sent(v)$—messages in $M(v)$ that v has sent
$D(v)$—nodes within transmission range
$Active(t)$—nodes receiving messages at time t
$Busy(t)$—nodes hearing/receiving/sending messages at time t
$trTime(v,m)$—time at which v sends m
$rcvTime(v,m)$—time at which v receives m
$R(m,v)$—nodes which want to receive m from v Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Several techniques have been proposed for broadcasting in wireless networks. Typically, in multihop wireless networks, interference at a node due to simultaneous transmissions from its neighbors can make it non-trivial to design a minimum-latency broadcast algorithm, which is known to be NP-complete. However, conventional systems fail to optimize the practical performance of approximation algorithms in order to reduce broadcast latency, while satisfying theoretical bounds associated with broadcast algorithms.

Systems and/or methods are presented herein that can address data broadcast and data collection problems by providing collision-free delivery, and achieving low latency and low redundancy in multihop wireless networks. In particular, the systems and methods can improve practical performance of a multiple approximation algorithm employed in wireless broadcast systems. Further, the systems and methods can ensure that a predefined theoretical guarantee can be achieved while reducing latency and redundancy in a practical environment.

Referring initially to FIG. 1, illustrated is an example system 100 that can facilitate improvement in practical performance of a wireless broadcast system, according to an aspect of the subject specification. Typically, the system 100 can include an optimization component 102 that can be employed to reduce broadcast latency and/or redundancy associated with a wireless network 104. According to an aspect, the wireless network 104 can be a mulithop wireless network.

In one aspect, the optimization component 102 can generate a scheme for broadcast scheduling that can optimize the practical performance of system 100. Various theoretical approaches have been presented for optimization; however, the traditional theoretical approaches do not address practical performance of a broadcast schedule. The optimization component 102 can generate an optimized schedule for a broadcast scheme associated with wireless network 104 that can achieve minimum latency without affecting a theoretical worst-case bound associated with the broadcast scheme. In accordance with an aspect, the optimization component 102 can occasionally prevent one or more nodes in wireless network 104 from relaying a packet to preserve the theoretical worst-case bound. Further, the optimization component 102 can select additional nodes that can be employed to relay the packet without affecting the worst-case bound.

Typically, the optimization component 102 can generate a model for the wireless network 104, such as, but not limited to, a unit disk graph (UDG). A UDG can typically be an intersection of unit disks in a plane and can be represented as, $G=(V, E)$. The nodes in V can be embedded in a plane. Each node $u \in V$ can have a unit transmission range. In an aspect, $|u,v|$ can denote the Euclidean distance between nodes u and v. Further, $D(u)$ can denote the neighbors of u in G. For example, a node $v \in D(u)$ iff $|u,v|<1$.

According to an aspect, the medium of transmission in network 104 can be wireless, and thus, whenever a node in the wireless network 104 transmits a message, the neighbors of the node can hear the message. Based in part on the UDG modeling, each message transmission can occupy a unit time slot, such that, the latency of a single successful transmission can be one unit of time. In one aspect, a collision can occur at a node w, when, for example, node w receives a message from two or more transmitting nodes at the same time. In such a case, it can be determined that the two or more transmissions interfere at node w. The node w can receive a message collision-free when w can hear the message without collision. Moreover, the optimization component 102 can determine a schedule for message transmission that can reduce collisions at nodes in wireless network 104.

The optimization component 102 can determine a schedule for transmission of messages in network 104, such that, the schedule can facilitate reduction in latency, redundancy and/or collisions. Moreover, the optimization component 102 can model the wireless network 104 as a UDG, $G=(V, E)$ and can identify a set of messages $M=\{1, 2 \ldots m\}$ (m can be an integer from one to infinity) associated with the nodes in the wireless network 104. Further, the optimization component 102 can identify a set of sources for these messages, for example, sources=$\{s_j | s_j$ is the source of message $j\}$ wherein j can be an integer from one to m. Furthermore, optimization component 102 can determine a sink node, such that a data collection problem can be addressed. In general, a node in wireless network 104 can transmit a message j once it receives message j collision-free. The optimization component 102 can determine a schedule that can specify, for each message j and each node i, a time at which node i can receive message j collision-free and a time at which node i can transmit message j. According to an aspect, when a node does not transmit a message, then it's transmit time for that message is considered, for example, by the optimization component 102, as zero.

The latency of the broadcast schedule, generated by the optimization component 102, can be calculated as a first time at which each node in wireless network 104 can receives each message. Further, the number of transmissions can be determined as a total number of times each node in network 104 transmits a message. In one aspect, the optimization component 102, can compute a schedule in which the latency is minimized, such that, theoretical bounds associated with the broadcast algorithm are not affected.

In accordance with one embodiment, the optimization component 102 can consider, for example, the following schemes: one-to-all broadcasting, all-to-all broadcasting, and all-to-one collection. Moreover, the optimization component 102 can determine a schedule for nodes to send and/or receive messages in each case. Specifically, in one-to-all broadcasting, one source node s can transmit a message to all other nodes in wireless network 104. Further, in all-to-all broadcasting, each node v can have its own message m(v) to send to all other nodes in the wireless network 104. Additionally, in all-to-one collection, each node v can have its own message m(v) to send to a sink node in the wireless network 104. According to an aspect, the schedule generated by the optimization component 102 can be employed by the plurality of nodes in the network 104 to transmit and/or receive one or more messages.

Figure 2:
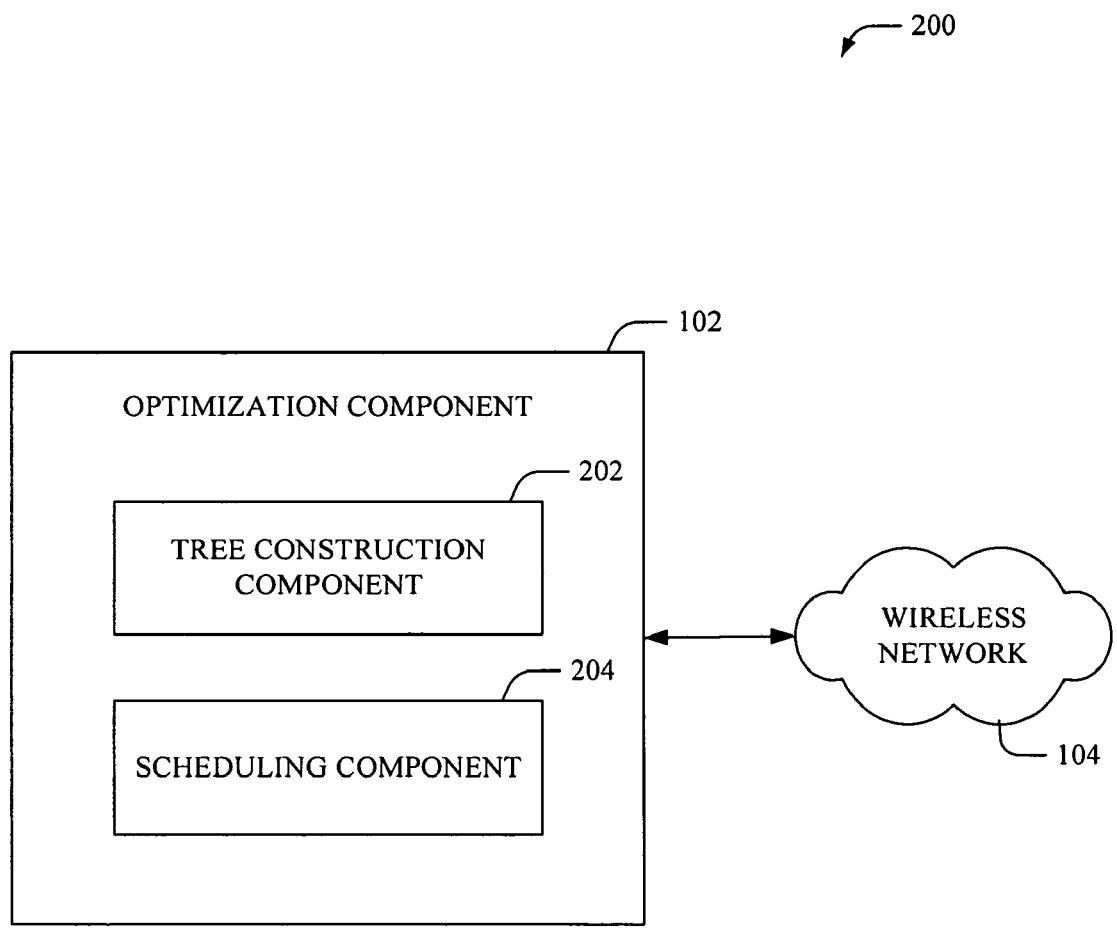
FIG. 2 illustrates an example system that can be employed to optimize practical performance during data broadcast and/or collection in wireless networks in accordance with the disclosure.

Referring now to FIG. 2, illustrated is an example system 200 that can be employed to optimize practical performance during data broadcast and/or collection in wireless networks in accordance with the disclosure. It can be appreciated that the optimization component 102 and wireless network 104 can include functionality, as more fully described herein, for example, with regard to system 100.

Typically, the optimization component 102 can include a tree construction component 202 that can be employed to generate a broadcast tree based in part on data associated with the wireless network 104. In one example, the broadcast tree can be employed to prevent collisions at a node. Further, a scheduling component 204 can be employed to determine an optimized broadcast schedule for transmitting and/or receiving messages from/at each node in wireless network 104. In particular, the scheduling component 204 can optimize a broadcast schedule associated with most any broadcast algorithm, such that, latency, redundancy and/or collisions are reduced but theoretical bounds associated with the broadcast algorithm are not affected.

According to an aspect, interference can occur at nodes in the wireless network 104 due to simultaneous transmissions from its neighbors. Thus, conventional systems employ a minimum-latency broadcast algorithm, which is known to be NP-complete. A common approach to NP-Complete problems is to develop approximation algorithms, which run in polynomial time and which produce provably good solutions. Moreover, an $\alpha$-approximation algorithm for a minimization problem II can be a polynomial-time algorithm such that, for every instance I of II it produces a solution of cost at most $\alpha$ OPT(I), $\alpha > 1$, where OPT(I) refers to cost of an optimal solution for instance I. In this case, the approximation algorithm can have an approximation factor of $\alpha$.

In accordance with an aspect, system 200 can be employed to reduce latency during broadcasting and/or data collection. Specifically, during one-to-all broadcasting, the tree construction component 202 can input a UDG G=(V, E) and a source node s associated with the network 104. The tree construction component 202 can construct a broadcast tree, rooted at s by employing most any tree construction technique. Further, the tree construction component 202 can ensure that a node u can be responsible for transmitting the message to node w without a collision at w, when node u is a parent of a node w. In addition, the scheduling component 204 can schedule transmission of a message, such that, each node receives the message collision-free. Moreover, the tree construction component 202 can determine an order in which nodes are processed while constructing the broadcast tree and the scheduling component 204 can allow a node to transmit the message more than once. The scheduling component 204 can transmit the broadcast schedule to the nodes in the wireless network 104. The broadcast latency can be reduced, efficiently and substantially, based on when the nodes in the wireless network 104 transmit and/or receive messages according to the broadcast schedule generated by the scheduling component 204.

According to another aspect, system 200 can be employed to reduce latency during all-to-all broadcasting. Moreover, during all-to-all broadcasting, each node v, in wireless network 104, can send a message m(v) to other nodes in the network 104. In this case, the tree construction component 202 can take as input a UDG G=(V, E) based on the data associated with wireless network 104 and can construct a broadcast tree. Further, the tree construction component 202 can select a root node s for the broadcast tree, for example, such that the height of the broadcast tree is minimized. In one example, the tree construction component 202 can build the broadcast tree in a manner, such that, when a node u is a child of node v in the broadcast tree, then node u is responsible for relaying all messages received from its subtree to node v collision free, and node v is responsible for sending remaining messages to the node u. Furthermore, based in part on the broadcast tree, the scheduling component 204 can generate a broadcast schedule for each node to transmit and/or receive messages. The schedule can enable each node in wireless network 104 to participate in broadcasting as soon as possible, such that, broadcast time can be minimized. For example, the scheduling component 204 can generate a broadcast schedule, such that, when a node v transmits a message m(x) to its parent to deliver the message to node s, the children of v also receive the message m(x) and they can initiate broadcasting m(x) in their subtrees in parallel.

According to another aspect, the system 200 can be employed to reduce latency during data collection, wherein each node in wireless network 104 has its own data to be sent to a sink node s. Typically, during data collection, messages cannot be merged and each message has to be delivered separately since, data cannot be merged. In particular, the tree construction component 202 can build a tree from sink s, for example a breadth first search (BFS) tree. In one aspect, the tree construction component 202 can sort messages m(v) in a non-decreasing order of the level of node v in the BFS tree. As an example, messages that are closer to s can appear first in the sorted list. Further, the scheduling component 204 can determine a schedule for messages m(v) to be transmitted to sink s based in part on an analysis of the BFS tree. For example, message j can be the $j^{th}$ message in the sort order associated with the BFS tree. The scheduling component 204 can schedule transmissions by giving priority to message j over a message i>j. Thus, the scheduling component 204 can generate an order of transmissions to a sink node in a manner, such that, latency is minimized.

Figure 3:
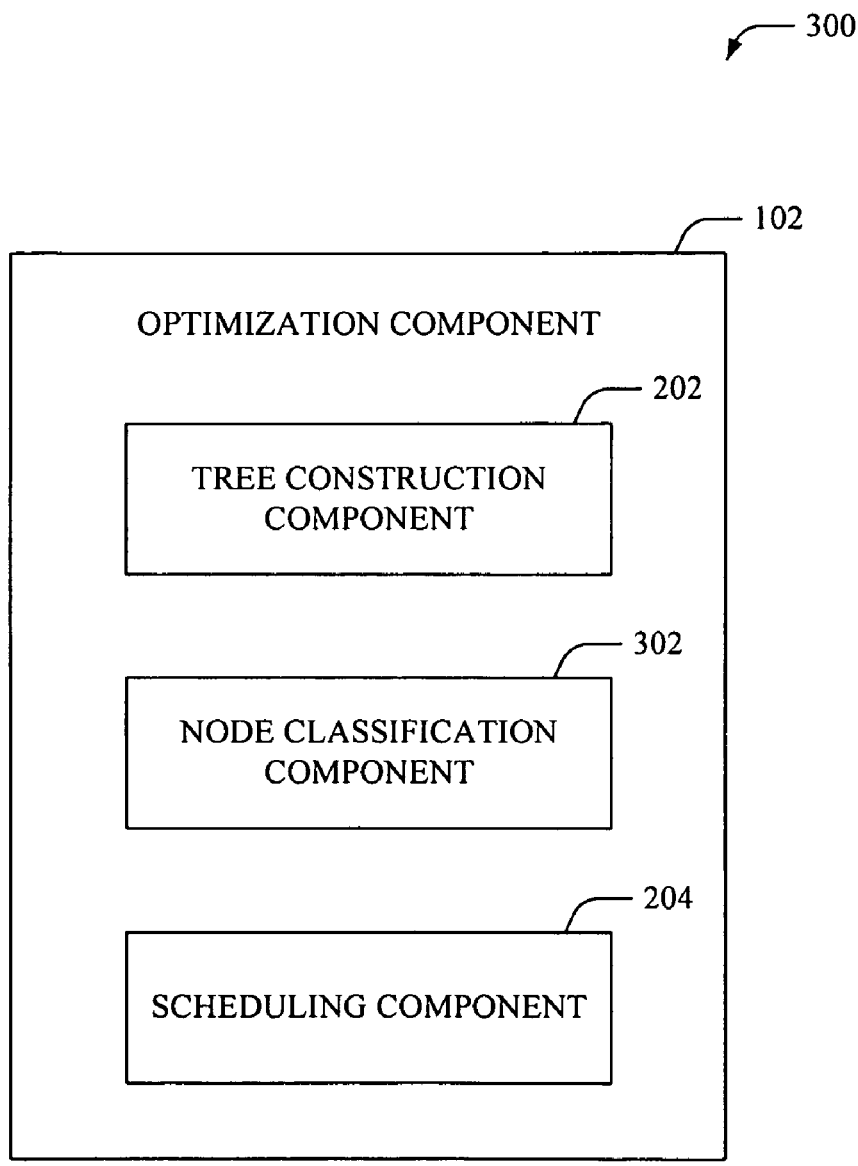
FIG. 3 illustrates an example system that can minimize latency in broadcast systems without affecting a theoretical bound associated with a broadcast algorithm in accordance with an aspect of the disclosure.

Referring now to FIG. 3, there illustrated is an example system 300 that can minimize latency in broadcast systems without affecting a theoretical bound in accordance with an aspect of the disclosure. In particular, an optimization component 102 can be employed by a multihop wireless network (104 in FIG. 1) to guarantee collision-free message delivery and achieve low latency, low redundancy during broadcast (e.g. one-to-all, all-to-all broadcast). It can be appreciated that the optimization component 102, tree construction component 202 and scheduling component 204 can include functionality, as more fully described herein, for example, with regard to systems 100 and 200.

In one aspect, the tree construction component 202 can be employed to create a broadcast tree based on data associated with the wireless network (104 in FIG. 1). As an example, the tree construction component 202 can partition a set of nodes V into primary nodes P and secondary nodes S. $T_{BFS}$ can be the breadth-first search (BFS) tree generated by the tree construction component 202 that can be rooted at s. Specifically, the BFS tree can comprise a set of nodes $L_i$ at level i in the BFS tree, wherein i=0, 1, 2, . . . , l, (l can be a whole number between zero and infinity). Further, P can be a maximal independent set in G constructed by considering one level at a time starting from $L_0$ in $T_{BFS}$. The nodes in P can form a dominating set in G, such that, each node in S is within the transmission range of some node in P. The tree construction component 202 can determine parent-child relationships in $T_b$ as follows: At a level i of the BFS tree, the tree construction component 202 can consider each node u∈$P_i$ in non-increasing order of the number of nodes in D(u) that do not have a parent yet (wherein $P_i$=P∩$L_i$ can be the set of primary nodes at level i in the BFS tree). The children of u in $T_b$ can be the secondary nodes in D(u) that do not have a parent when u is considered. After considering each node in $P_i$, the tree construction component 202 can consider secondary nodes in non-increasing order of the number of nodes in $P_{i+1}$ that do not have a parent. For each node u∈$S_i$ that is considered by the tree construction component 202, its children C(u) in $T_b$ can be u's neighbors in $P_{i+1}$ that do not have a parent at the time u is considered (wherein $S_i$=S∩$L_i$ can be the set of secondary nodes at level i in the BFS tree). In one example, pseudocode for the construction of a broadcast tree that can be employed by the tree construction component 202 can be as follows:

```
BROADCASTTREE(G = (V, E), s)
1      P ← P_o ← {s} //P is the set of primary nodes.
2      T_BFS ← BFS tree in G with root s
3      l ← maximum number of levels in T_BFS
       // s belongs to level 0
4      for i← 1 to l do
5          L_i ← set of all nodes at level i in T_BFS
6          P_i ← 0
7          for each w ∈ L_i do
8              if ( P∩ D(w)=0) then
9                  P_i ← P_i∪ {w}
10                 P← P∪ {w}
11         S_i ← L_i \ P_i
12     P_{l+1} ← 0
13     S← V\P
14     for each node u ∈ V do
15         parent(u) ← NIL
16     for i← 0 to l do
17         P_i' ← P_i
18         while (P_i' ≠ 0) do
19             u ← node in P_i' with maximum
                   |{w ∈ D(u)| parent(w) = NIL}|
20             C(u) ← {w ∈ D(u)| parent(w) = NIL}
21             for each w ∈ C(u) do
22                 parent(w) ← u
23             P_i' ← P_i' \ {u}
24         while (∃ w ∈ P_{i+1} s.t. parent(w) = NIL) do
25             u ← node in S_i with maximum
                   |{w ∈ D(u) ∩ P_{i+1}| parent(w) = NIL}|
26             C(u) ← {w ∈ D(u) ∩ P_{i+1}| parent(w) = NIL}
27             for each w ∈ C(u) do
28                 parent(w) ← u
29     V_b← V
30     E_b ← {(u, w)|u = parent(w)}
31     return T_b = (V_b,E_b)
```

According to an aspect, a node classification component 302 can be employed to select one or more nodes for scheduling transmission based in part on the generated broadcast tree. The node classification component 302 can identify one or more sets of nodes that can be grouped together for scheduling transmissions during a time slot based on the type of broadcast, for example, one-to-all or all-to-all broadcast. As an example, the node classification component 302 can identify a set X of primary nodes and non-leaf secondary nodes in the broadcast tree. During one-to-all broadcast, the scheduling component 204 can schedule transmissions in two phases as follows: in a first phase, the scheduling component 204 can schedule transmissions only to the nodes in set X, which can be identified by the node classification component 302. Further, in the second phase, the scheduling component 204 can schedule transmissions to send the message to the other nodes excluded from set X.

Moreover, during the first phase, the scheduling component 204 can consider nodes one level at a time starting from $L_0$. The primary nodes that have a child in set X can be scheduled for transmission in this phase. Further, for most any primary node u, if C(u)≠0 and C(u)∩X=0 then u can be selected by the scheduling component 204 to transmit the message in the second phase. At a level $L_i$, the scheduling component 204 can select secondary nodes for transmission only after the transmissions of primary nodes in $P_i$ have been scheduled. According to one aspect, the scheduling component 204 can consider the nodes in $P_i$ as well as $S_i$∩X in non-increasing order of the number of their children in the broadcast tree. In addition, the scheduling component 204 can employ a greedy strategy to schedule the collision-free transmissions to nodes in X. For example, a transmitting node u can be scheduled (e.g. by the scheduling component 204) to transmit at a minimum time t when the following three constraints have been satisfied: (i) u has received the message collision-free before time t, (ii) no node in C(u)∩X can hear a transmissions at time t, and (iii) no node in D(u)∩X can be receiving the message collision-free at time t. The scheduling component 204 can determine the minimum time t and accordingly schedule transmissions to reduce latency.

The scheduling component 204 can further schedule transmissions in a second phase, such that, nodes in Y=V\X receive the message. Similar to the transmission in phase one, nodes can be considered one level at a time. Thus, for each node v∈Y, parent(v) can be responsible for transmitting the message collision-free to v. Since P∩Y=0, the secondary nodes do not transmit in the second phase. For example, a transmitting node u can be scheduled (e.g. by the scheduling component 204) to transmit at a minimum time t that satisfies the following three constraints—(i) u has received the message collision-free before time t, (ii) no node in C(u)∩Y can hear a transmissions at time t, and (iii) no node in D(u) can be receiving the message collision-free at time t. Thus, the scheduling component 204 can specify and/or set the transmit times of each node at most twice, once in each phase.

According to another aspect, during all-to all broadcasting, each node v can have a message m(v) to send to other nodes in the network (104 in FIG. 1). The tree construction component 202 can input a UDG G=(V, E), and construct a broadcast tree $T_b$, as described supra. Further, the tree construction component 202 can determine a root node s, such that, the height of the broadcast tree $T_b$ is minimized. Accordingly, when u is a child of v in the broadcast tree, u can be responsible for relaying messages received from its subtree to v collision free, and v can responsible for sending the remaining messages to u. Further, the node classification component 302 can identify primary and/or secondary nodes from the broadcast tree based on the broadcast type (e.g. all-to-all broadcast). Furthermore, the scheduling component 204 can determine a schedule for transmission of messages for the primary and/or secondary nodes that minimizes latency.

As an example, during all-to-all broadcast, the scheduling component 204 can introduce a superstep, wherein each node can transmits at most one message if there is a message that the node has received but not sent. The scheduling component 204 can determine an order of transmissions by employing the following rules: (Rule 1) considering primary nodes first and then scheduling secondary nodes; (Rule 2) determining the order of scheduling primary nodes as follows: A square of G, denoted as $G^2$, is a graph where there is an edge between node u and v if their distance in G is at most 2. $G^2$ [P] can be the induced subgraph of $G^2$ by primary nodes. Accordingly, the scheduling component 204 can consider primary nodes in a non-increasing order of their degrees in $G^2$ [P] (e.g. smallest degree-last ordering); and, (Rule 3) determining the order of scheduling secondary nodes, such that, the nodes can be considered in the order of their depth in $T_b$ (e.g. considering the root node first). Among nodes at the same depth, the nodes having a message for upward transmission can be considered first.

Further, the scheduling component 204 can determine an order in which each node can perform either upward (e.g. from child to parent and children) or downward transmission (e.g. from parent to children). Moreover, when a node v has a message for upward transmission and none of the siblings of v have sent a message to p(v) in the superstep, then v can be scheduled (e.g. by the scheduling component 204) to perform an upward transmission. Additionally, the scheduling component 204 can schedule remaining nodes to perform downward transmissions if there is a message to be sent, after the upward transmissions for each node in the current depth have been scheduled. Therefore, in each superstep, the scheduling component 204 can schedule each node to transmit at most one message, either upward or downward, and receive at most two messages, one from one of its children and one from its parent. It can be appreciated that a subset of the messages that a node can receive can be redundant, for example, a node v may receive m(v) when the parent of node v transmits m(v) to its parent.

Figure 4:
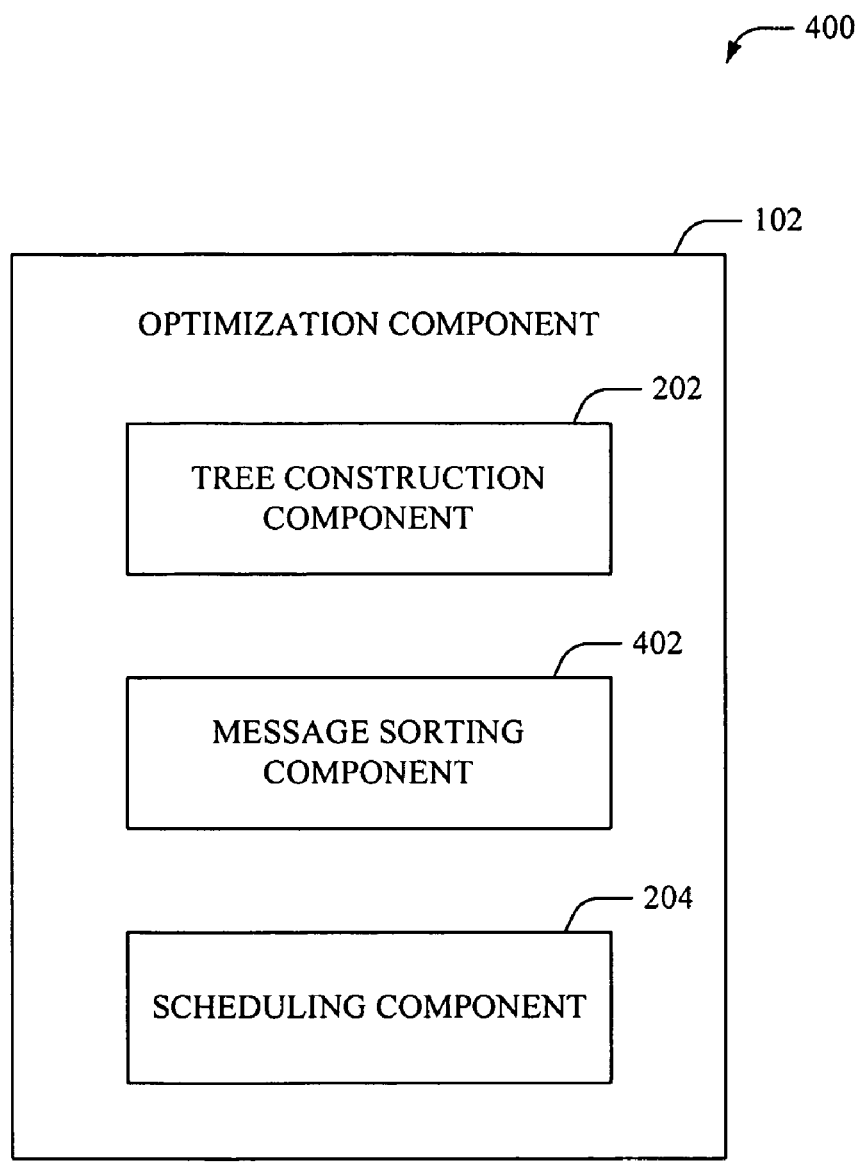
FIG. 4 illustrates an example system that can be employed to minimize latency during all-to-one data collection, according to an aspect of the subject innovation.

Referring now to FIG. 4, there illustrated is an example system 400 that can be employed to minimize latency during all-to-one data collection, according to an aspect of the subject innovation. It can be appreciated that the optimization component 102, tree construction component 202 and scheduling component 204 can include functionality, as more fully described herein, for example, with regard to systems 100, 200 and 300. Additionally or alternately, the optimization component 102 can include a message sorting component 402 that can be employed to facilitate scheduling in a manner to reduce latency during all-to-one data collection.

In the data collection problem, messages cannot be merged and each message has to be to be delivered separately. Some conventional systems consider a slightly different problem, called the data aggregation problem wherein data from multiple messages can be merged and forwarded to other nodes in one message. However, this is appropriate only when collecting aggregated information (e.g. the maximum or minimum) is sufficient. Specifically, the data collection problem can be more challenging than the data aggregation problem since data cannot be merged.

System 400 can address the data collection problem and further reduce the latency during collection. Moreover, the tree construction component 202 can be employed to build a broadcast tree for the network (104 in FIG. 1) as described in detail above with respect to FIG. 3. In particular, during all-to-one collection, the tree construction component 202 can build a BFS tree from a sink node s. Further, the message sorting component 402 can be employed to sort messages m(v) in a non-decreasing order of the level of node v in the BFS tree. The message sorting component 402 can generate a sorted list of messages based in part on data from the BFS tree. For example, messages that are closer to s can appear first in the sorted list.

According to an aspect, the scheduling component 204 can employ the sorted list and schedule transmissions by utilizing a greedy approach, such that latency can be minimized. For example, message j can be the j-th message in the sorted list generated by the message sorting component 402. The scheduling component 204 can greedily schedule transmissions by giving priority to message j over a message i>j. Thus, by arranging the messages based on a priority, and scheduling the transmission of the messages based on the arrangement, the latency in all-to-one data collection can be reduced without affecting a theoretical bound.

FIGS. 5A-5C illustrate example schematic diagrams of various broadcast schemes in accordance with the subject innovation. FIG. 5A depicts a one-to-all broadcast scheme, wherein a source S can send a message to all other nodes (N1-N4) in the network 502. FIG. 5B illustrates an all-to-all broadcast scheme, wherein each node (N1-N3) sends its own message to all other nodes (N1-N3) in the network 504. Further, FIG. 5C illustrates an all-to-one collection scheme wherein, each node (N1-N4) can send its message to a sink node S. It can be appreciated that although only four nodes N1-N4 are depicted in FIG. 5A and FIG. 5C, and three nodes N1-N3 are depicted in FIG. 5B, the networks can have a plurality of nodes N1-Nm (where m is a natural number from two to infinity). It can be appreciated that the source S and sink s can be most any node in the multihop wireless network and can include most any electronic device that can communicate with the multihop wireless network as described supra. The networks 502-506 can employ an optimization component (102 in FIG. 1) to optimize a broadcast schedule associated with a broadcast algorithm employed by the networks 502-506, such that, latency can be reduced without affecting theoretical bounds associated with the algorithm.

Referring to FIG. 5A, illustrated is a broadcast network 502 wherein a source S can send a message to each node (N1-N4) in the network 502. The network 502 can employ an optimization component (102 in FIG. 3) to schedule transmissions of the message in a manner than minimizes latency without affecting a theoretical bound. In one example, the following pseudocode can be employed (e.g. by the optimization component 102) to schedule transmissions.

---

ONE-TO-ALL BROADCAST(G, $T_{BFS}$, $T_b$, s)
1     for each node u ∈ V do
2          $trTime_1(u) \leftarrow 0$
3          $trTime_2(u) \leftarrow 0$
4     X ← P ∪ {w ∈ S | C(w) ≠ 0} // set of transmitters -continued

```
5       Y ← V\X //set of terminals
6       // Phase 1 - transmitters will receive the message
7       for i ← 0 to l−1 do
8            P_i' ← {u ∈ P_i | ∃ w ∈ C(u)∩ X}
9            X_i ← nodes in P_i' ∪ (X ∩ S_i) with all primary nodes ordered before the
             secondary nodes and the primary and secondary nodes listed in the
             order they were chosen in lines 19 and 25 resp. in
             BROADCASTTREE.
                while (X_i ≠ 0) do
11                 u ← first node in X_i
12                 I_1(u) ← {t| ∃ w ∈ C(u)\Y that hears a message at time t}
13                 I_2(u) ← { t| ∃ w ∈ D(u)\Y that receives a message collision-free
                   at time t}
14                 I(u) ← I_1(u)∪ I_2(u)
15                 trTime_1(u) ← min{t| t> rcvTime(u) and t ∉ I(u)}
16                 for each w ∈ C(u)\Y do
17                      rcvTime(w) ← trTime_1(u)
18                 X_i ← X_i \{u}
        // Phase 2 - the terminals will receive the message
19      Y'=Y
20      for i ← 0 to l do
21           for each u ∈ S_i ∩ Y' do
22                v ← parent(u)
23                I_1(v) ← {t| ∃ w ∈ C(v)∩ Y' that hears a message at time t}
24                I_2(v) ← { t| ∃ w ∈ D(v) that receives a message collision-free at
                  time t}
25                I(v) ← I_1(v)∪ I_2(v)
26                trTime_2(v) ← min{t| t> rcvTime(v) and t ∉ I(v)}
27                for each u ∈ C(v) ∩ Y' do
28                     rcvTime(u) ← trTime_2(v)
29                Y' ← Y'\C(v)
30      return trTime_1, trTime_2
```

The above pseudocode can reduce latency without affecting theoretical bounds. Moreover, for each node u, D(u) can be the set of nodes in the neighborhood of u (e.g., identified by the node classification component 302). Further, D(u, 2) ($D_p$(u, 2)) can be the set of nodes (primary nodes) at a distance of at most 2 from u. According to an aspect, for each node v, the number of primary nodes in D(v), $|D_p(v)| \leq 5$ and $|Dp(v, 2)| \leq 19$. In another aspect, $P_j(u)$ can denote the primary neighbors of u that belong to $L_j$. In addition, $t_i$, $0 \leq i \leq l$, can be the time at which each transmitter in $L_i$ can finish transmitting once, e.g., $\forall u \in L_i$, $trTime_1(u) \leq t_i$.

In one aspect, the pseudocode for the one-to-all broadcast that can be employed by network 502 can ensure that at least the following bounds (lemmas) are not affected and can still hold true:

(i) $T_b$ can be a connected tree rooted at s.

(ii) $|\{u, w\} \cap P| = 1$ when $\{u, w\} \in E_b$.

(iii) When $C(u) \cap X \neq 0$, then $trTime_1(u) = 0$, wherein, a node $u \in P_i$, $0 \leq i \leq l$. Further, the set X (line 4 in ONE-TO-ALL BROADCAST) is the set of transmitters. The proof can be as follows: If $C(u) \cap X = 0$, then $u \notin P_i'$ (line 8 in ONE-TO-ALL BROADCAST), and hence $trTime_1(u) = 0$.

(iv) $trTime_1(u) \leq t_{i-1} + [(17 - |P_{i+1}(v) \cup P_{i+2}(v)|)/2] + 1 \leq t_{i-1} + 9$, wherein a node $u \in P_i$, $0 \leq i < l$ and v can be a secondary node in $C(u) \cap X$. The proof can be as follows: Since $parent(u) \in L_{i-1}$ and all transmitters in $L_{i-1}$ transmit a message by time $t_{i-1}$, $rcvTime(u) \leq t_{i-1}$. Since the secondary transmitters in $L_i$ are scheduled only after transmitters in $P_i$, secondary nodes in $S_i$ do not interfere with u. Further, since nodes in Y are ignored when computing interference (lines 12 and 13 in ONE-TO-ALL BROADCAST), for each secondary node $w \in D(u)$ at which some node interferes with u it must be that $w \in X$. It can be appreciated that because of the manner in which the children of primary nodes are determined in $T_b$ (line 19 in BROADCASTTREE) and the order in which the transmissions are scheduled (line 9 in ONE-TOALL BROADCAST), no primary node can interfere with u at nodes in $C(u) \cap X$. Hence, $w \notin C(u)$. In addition, it can be noted that if $w \in L_{i-1}$, then after time $t_{i-1}$ a collision will not occur at w. Thus, $w \in L_i \cup L_{i+1}$ and hence parent(w) can interfere with u whereas the primary children of w cannot. This can result in the two in the denominator of the expression that follows. Thus, $|I(u)| \leq [(|D_p(u,2)| - 2 - |P_{i+1}(v) \cup P_{i+2}(v)|)/2]$. The 2 in the numerator can account for u and parent(parent(u)). The bound can be followed because $|D_p(u,2)| \leq 19$, $|P_{i+1}(v) \cup P_{i+2}(v)| \geq |C(v)| \geq 1$ and since $trTime_1(u) \leq t_{i-1} + |I(u)| + 1$.

(v) $trTime_1(v) \leq t_{i-1} + 12$, wherein v can be a secondary transmitter in $L_i$, $0 \leq i \leq l$. The proof can be as follows: $v \in L_i$ then, v is not in X. Hence, $trTime_1(v) = 0$. Further, when $v \in L_j$, $j < l$, then, based on (iv), each secondary nodes in $S_j \cap X$ can receive the message by time $t_{i-1} + 9$. After this time some secondary nodes in $S_i \cap X$ can interfere with v at primary nodes in $I(v) = P_{i+1}(v) \setminus C(v)$. Since $|D_p(v)| \leq 5$ and $parent(v) \notin P_{i+1}(v)$, $|I(v)| \leq 3$. Thus, $trTime_1(v) \leq t_{i-1} + 9 + |I(v)| + 1$. When $|I(v)| \leq 2$ then the bound is followed. Now, considering the case when $|I(v)| = 3$. w can be a secondary node in $D(v) \cap S_i \cap X$. It can be noted that D(w) can contain some primary node in $P_{i+1}(v)$, otherwise in D(v) there can be more than 5 nodes (4 nodes in $P_{i+1}(v)$, parent(v) and w) with pairwise distance of at least 1, which is not possible. Further, let $z \in D(w) \cap P_{i+1}(v)$. If z is not in C(w), then since $|C(w)| \geq 1$, $|P_{i+1}(w)| \geq 2$. Plugging this value in the expression in (iv), $rcvTime(w) = trTime_1(parent(w)) \leq t_{i-1} + 8$. Further, if $z \in C(w)$ then in line 25 of BROADCASTTREE, w can be chosen before v. At that point in the pseudocode, v can have at least two primary nodes (z and C(v)) in D(v) which do not have a parent. This can imply that $|C(w)| \geq 2$ and again by (iv), $trTime(w) \leq t_{i-1} + 8$. Thus, when $|I(v)| = 3$, each secondary node in $D(v) \cap S_i \cap X$ can receive the message by time $t_{i-1} + 8$. Hence, $trTime_1(v) \leq t_{i-1} + 8 + |I(v)| + 1 \leq t_{i-1} + 12$.

(vi) For $0 \leq i \leq l-1$, the time by which all transmitters in $L_i$ transmit the message once is $t_i \leq t_{i-1}+12$. The proof can be derived from (iii)-(v).

(vii) trTime$_2$(v)=0 wherein v∈S can be a secondary node. The proof can be as follows: In Phase 2, the nodes that transmit the message can have a child in Y. According to (ii), $C(v) \subseteq P$ and $P \cap Y = \emptyset$ it can be derived that trTime$_2$(v)=0.

(viii) rcvTime(u)$\leq t_{i+2}+19$, wherein $0 \leq i \leq l-2$, and u∈S$_i$ can be a terminal node, for example, u∈S$_i \cap$ Y. The proof can be derived as follows: Let v=parent(u). It can be noted that v∈P$_j$, j∈{i-1, i}. The nodes that can interfere with v can belong to the set D(v,2). Let B1(v)=D(v,2)∩$(L_{j-2} \cup L_{j-1} \cup L_j)$ and B2(v)=D(v,2)∩$(L_{j+1} \cup L_{j+2})$. Thus, $|I(v)| \leq |\{(trTime_1(w), trTime_2(w))|w \in B1(v)\} \cup \{trTime_1(w)|w \in B2(v)\}|$. It can be know that for each node w∈B1(v), trTime$_1$(w)$\leq t_i$. Based on (vii), trTime$_2$(w)=0 for all w∈S. Hence, after time $t_i$, v can be guaranteed a collision-free second transmission if v avoids transmitting at trTime$_2$(w) for each primary node in w ∈B1(v)\{v} and at trTime$_1$(w) for each w ∈B2(v). Thus, after time $t_i$, v can avoid at most one time corresponding to each primary node in D$_p$(v, 2)\{v}, cardinality of which is at most 18, and at most one time (trTime$_1$(•)) for each secondary node w∈D(v,2)∩$(S_{i+1} \cup S_{i-2})$. There can be at most $(t_{i+1}-t_i)+(t_{i+2}-t_{i+1})$ times when each secondary node in $S_{i+1} \cup S_{i-2}$ can transmit a message. Hence, trTime$_2$(v)$\leq t_i+18+(t_{i+1}-t_i)+(t_{i+2}-t_{i-1})+1 \leq t_{i+2}+19$.

(ix) For any v∈X, rcvTime(v)$\leq t_{l-1}$. The proof can be derived as follows: Nodes in X∩L$_i$, $0 \leq i \leq l-1$, can receive their message by the time $t_i$. It can be appreciated that X∩L$_l$=P$_l$ and these nodes can have their parents in L$_{l-1}$. Hence, they can receive their message by time $t_{l-1}$.

(x) rcvTime(v)$\leq t_{l-1}+19$, wherein v can be a vertex in L$_i$, $0 \leq i \leq l-2$. The proof can be derived as follows: If v∈X, then by (ix), rcvTime(v)$\leq t_{l-1}$. Further, if v∈S, then by (v), (viii), and i<l-2, it can be derived that rcvTime(v)$\leq t_{i+2}+19 \leq t_{l-1}+19$.

(xi) rcvTime(u)$\leq t_{l-1}+19$, wherein $l-2 \leq i \leq l$, for any u∈L$_i$. The proof can be derived as follows: If u∈X, then based on (ix), rcvTime(u)$\leq t_{l-1}$. Otherwise, if u∈Y, let v=parent(u). Since trTime$_1$(w)$\leq t_{l-1}$ for all w∈V, and secondary nodes can transmit at most once (by vii), v can be guaranteed collision-free second transmission after $t_{l-1}$ if v avoids second transmission times of nodes in D$_p$(v, 2)\{v}. Hence, trTime$_2$(v)$\leq t_{l-1}+|D_p(v, 2)|-1+1 \leq t_{l-1}+19$.

(xii) According to an example, the pseudocode can give a 12-approximate solution. Moreover, when v∈V, rcvTime(v)$\leq t_{l-1}+19$ (from (x) and (xi)). Further, based on (vi), an equation 1 can be determined as rcvTime(v)$\leq t_l + 12(l-2)+19$. It can be appreciated that, $t_0=1$. Further, for each secondary node w∈L$_1$, secondary nodes at a distance of at most 2 from w can interfere at, at most three primary nodes in D(w). Hence, $t_1 \leq t_0+3+1=5$. Combining this with the equation 1, rcvTime(v)$\leq 12(l-2)+24=12l$ can be obtained. Since l can be a lower bound on an optimal solution, a 12-approximate solution can be obtained.

(xiii) The number of transmissions in the pseudocode can be at most 3|P|. The proof can be derived as follows: Each primary node can transmit at most twice, for example, at most once in Phase 1 and at most once in Phase 2. Since secondary nodes do not transmit in Phase 2, each secondary node can transmit at most once. By (ii), each secondary node that transmits can have a unique child that can be a primary node. Hence, the number of transmitting secondary nodes can be at most |P|. Hence, the total number of transmission can be at most 3|P|.

(xiv) The number of retransmissions in an optimal algorithm can be at least |P|/7.

(xv) The number of transmissions in the pseudocode can be at most 21 times the number of transmissions in an optimal algorithm.

Referring back to FIG. 5B, there illustrated is an all-to-all broadcast network 504 with three nodes N1-N3 that can transmit messages to each other. Specifically, the network 504 can employ an optimization component (102 in FIG. 3) to schedule transmission of messages, such that, broadcast latency is minimized without affecting a theoretical bound associated with a broadcast algorithm. In one example, the pseudocode given below can be employed (e.g. by the optimization component 102) to schedule transmissions:

```
ALL-TO-ALL BROADCAST ALGORITHM
1      for each node v in V_b
2          Rcv(v) = {m(v)}; Sent(v) = 0
3      X={v|C(v) ≠ 0};Y= V_b\X
4      V_f=V_b ; t=0
5      while (V_f ≠ 0)do
6          Q = {v|Rcv(v) \ Sent(v) ≠ 0}
7          F=0
8          for v ∈ X do
9              dRcv(v) = false
10         while (Q ≠ 0)
11             t = t+1
12             Active(t) = 0; Busy(t) = 0
13             for v ∈ Q in the order described in Rule 1, 2 & 3 do
14                 if (p(v)≠ null and (dRcv(p(v)) = true
                       or M(p(v)) \ Rcv(p(v)) = 0)) then
                       // downward
15                     M = Rcv(v) \ (Sent(v) ∪ M(v))
16                 else if (v ∈ Y and dRcv(p(v)) = true) then
17                     Q=Q\{v}
18                     F=F∪ {v}
19                     M=0
20                 else //down or upward
21                     M = (Rcv(v) \ Sent(v))
22                 for message m ∈ M do
23                     R(m,v) = N_b(v) \{u|m ∈ Rcv(u)}
24                     if (R(m,v) = 0 or Busy(t) ∩ D(v) ≠ 0
                           Or Active(t) ∩ R(m,v) ≠ 0) then
25                         M=M\{m}
26                 if(M ≠ 0)then
27                     m = a message in M, choose from
                           M∩ M(v) if not empty
28                     Sent(v) = Sent(v) ∪ {m}
29                     trTime(v,m) = t
30                     for (node u ∈ R(m,v)) do
31                         Rcv(u) = Rcv(u) ∪ {m}
32                         RcvTime(u,m) = t
33                         if (m ∈ M(u)) then
34                             dRcv(u) = true
35                         if (u ∉ F and u is a
                               secondary) then
36                             Q=Q∪ {u}
37                     Q = Q \ {v};
38                     F=F∪ {v};
39                     V_f=V_f\{u||Rcv(u)|=N}
40                     Busy(t) = Busy(t) ∪ D(v) ∪
                           {v}
41                     Active(t) = Active(t) ∪
                           R(m,v)
```

According to an embodiment, the above pseudocode for all-to-all broadcast can be employed by network 504 can ensure that at least the following bounds (lemmas, theorems, corollaries) can hold true after optimization:

(1) Each superstep performed, for example, by the optimization component (102 in FIG. 3) can take at most 21 rounds for the first $M_{max}$ supersteps. After which, the superstep can take at most 17 rounds. It can be appreciated that for each node v, $N_b(v)$ can be the neighbors of v in the broadcast tree $T_b$. Further, $M_{max}$ can be $max_{v \neq s}|M(v)|$. The proof can be derived as follows: Consider that each node in P can be processed first and then each node in S. It can be appreciated that the lemma can hold true even when the transmissions of P and S are interleaved. A node v can be a primary node and the number of colors required to color graph $G^2$ [P] can be at most 12 by employing a smallest-degree-last ordering. Therefore, transmissions of primary nodes can be sent in 12 rounds. Additionally, for a secondary node v, the nodes which v can be responsible for transmitting to are primaries, and the number of primaries in D(v) can at most be 5. Further, C(v) can be a set of children of v in $T_b$. Moreover, transmissions from children of C(v) cannot interfere with v since v can be considered before them. Furthermore, each node in D(v)\C(v) can receive one upward transmission from its child and one downward transmission from its parent. Thus, v can avoid at most two time slots for each node in D(v)\C(v) for the first $M_{max}$ supersteps. After that, upward transmissions are not scheduled except the ones to the root (but the root does not receive downward transmissions). Therefore, v can wait at most $12+2(5-|C(v)|) \leq 12+8$ rounds before a message for the first $M_{max}$ supersteps can be transmitted and after which, v can wait at most $12+(5-|C(v)|) \leq 12+4$ rounds, which proves the lemma (1).

(2) After t supersteps (t<|M(v)|), each node v can receive at least t+1 messages in M(v). The proof can be derived as follows: When t=0, lemma (2) can be true since every node has its own message. It can be assumed that the lemma (2) can be true for any t<t'. Then after (t'−1) supersteps, v can have at least t' messages in M(v). In one aspect, $c_1(v), c_2(v), \ldots, c_k(v)$ can be the children of v. Each of the children can have at least min(t', $|M(c_i(v))|$) messages in $M(c_i(v))$, not including m(v) by induction hypothesis. If there can be any $c_i(v)$ having t' messages, then there can be at least one message that has not received from $c_i(v)$ (as those t' messages do not include m(v)). In case that each child $c_i(v)$ can have $|M(c_i(v))|$ messages but v can have less than |M(v)|, then again there can be one message that v has not received from its children. Therefore, at least one of its children which can have a message to send to v can transmit the message in superstep t'.

(3) After t+[d(v)/2] supersteps, v has sent out at least t messages unless v is a leaf, wherein v can be a node and d(v) can be the depth of v in $T_b$. The proof can be derived as follows: It can be noted that d can be even for primary nodes and odd for secondary nodes. When d=0, Lemma (3) can be held true based on (2) and since the root can send out one message every superstep for the first |M(s)| rounds. Suppose that the lemma (3) is true for all nodes with depth d<d' and for a node v with depth d' it is true for t<t'. Specifically, a node v with depth d' for t=t', can be a primary node (e.g., d' is even). By induction hypothesis, v can send at least t'−1 messages after t'−1+[d(v)/2] supersteps. Lemma (3) can be proved based in part on the following: a parent u can be a secondary node and v can receive t' messages from u within t'−1+[d(v)/2]=t'+[d(u)/2] supersteps (by induction hypothesis for u). Thus, if the messages are already sent by v, the lemma can be true, else, v can send the message that it has not sent. Further, in a case wherein v can be a secondary node, by the time the secondary nodes are processed for t', v can receive t' messages from its parent u (by the induction hypothesis and the proof in the previous paragraph). Thus, v can send at least one of those messages.

(4) The broadcast time of all-to-all broadcast can be at most $21 M_{max}+17(N-M_{max}+D/2)$ wherein N can be the number of nodes in the network 504 and D can be the maximum depth of a node in $T_b$. The proof can be derived as follows: Each node can receive each of the messages in N+D/2 supersteps, based on Lemma (3). Further, at most $M_{max}$ supersteps can take 21 rounds in the worst case and after that, each superstep can take 17 rounds.

(5) The broadcast time of all-to-all broadcast can be at most 23¼N wherein N can be the number of nodes in the network 504. The proof can be derived as follows: $M_{max}$>N/2. Further, there can be a child v of s, such that, the subtree rooted at v can have a size of at least N/2. Thereafter, node v can be employed as a new root node for the broadcast tree and the original root s can be a child of v. This modification can be repeated until $M_{max} \leq N/2$, and the broadcast tree with depth at most N/2 can be obtained. As $D \leq M_{max}$, we have the corollary (5) can hold true.

(6) The number of transmissions for each message scheduled, for example, by the scheduling component (204 in FIG. 2) can be at most 15 times the number of transmissions scheduled by a theoretical optimal algorithm. The proof can be derived as follows: Each primary node can transmit message m at most once. Further, each secondary node can send m only if it has a unique child that is a primary or it is the source of message m. Therefore, the number of transmissions of message m can be at most 2|P|+1. Accordingly, for N messages, the total number of transmissions can be 2N|P|+N.

Referring back to FIG. 5C, there illustrated is an all-to-one collection network 506, wherein nodes N1-N4 can transmit messages to a sink node S. Specifically, the network 506 can employ an optimization component (102 in FIG. 4) to schedule transmission of messages in a manner that minimizes latency without affecting a set of theoretical bounds. In one aspect, the messages from nodes N1-N4 can be sorted, by a message sorting component (402 in FIG. 4), for example, based on the distance of the node sending the message, from sink node S. In addition, a scheduling component (204 in FIG. 4) can be employed by network 506 to greedily schedule transmissions by giving priority to message for transmission based on the sorted list.

In one aspect, l(j) can be defined as a level of a node (e.g. N1-N4) that can send a message j initially and p(j) can be a first message to be sent to sink node S among all messages in level l(j). Further, M can be the total number of messages that sink node S can receive. The network 506 can schedule transmissions to the sink node S (e.g. by employing an optimization component 102), without affecting at least the following lemmas:

(a) $max_j\{M-p(j)+l(j)\}$ is a lower bound on an optimal solution. The proof can be derived as follows: A message j can employ at least l(j) steps to reach S and the number of messages at level l(j) or below, initially can be M−p(j)+1. Further, k can be a message that can maximize $max_j\{M-p(j)+l(j)\}$. It can be assumed that network 506 can have only M−p(k)+1 messages and these messages can be at level l(k) initially. In addition, it can be appreciated that the optimal solution of this instance is no more than the optimal solution for the original data collection problem. The sink S can start receiving the messages no earlier than at step l(k) and continue to receive at most one message at a time after that. Thus, the modified instance can employ at least $M-p(k)+l(k)$ steps.

(b) For any j, i<l(j), $f(i,j) \leq 2(j-1)+\max_{k \leq j}\{j-p(k)+l(k)-i\}$, wherein, f(i, j) can denote the time at which message j can reach a level i without collision. The proof can be derived as follows: The lemma can hold true when j=1. Further, if assumed that the lemma is true for all j<j', then for message j'+1, it can be assumed that the lemma can be true for i=i'+1, which can imply that message j'+1 can reach level i'+1 no later than $t=2j'+\max_{k \leq j'}\{j'-p(k)+l(k)-i'\}$. It can be derived that by time t a message j<j' can reach level i'-2 or above, which can mean that message j'+1 can be delivered to level i' without interferences in one time unit and hence the induction can hold. For a message j<j', the time that message j can reach level i'-2 can be no later than $2(j-1)+\max_{k \leq j}\{j-p(k)+l(k)-i'+2\} \leq 2j+\max_{k \leq j}\{j-p(k)+l(k)-i'\} \leq 2j'+\max_{k \leq j'}\{j'-p(k)+l(k)-i'\}$.

(c) There can be a 3-approximation algorithm for the data collection. The proof can be derived as follows: Sink S can receive messages in time $2(M-1)+\max_k\{M-p(k)+l(k)\}$. Since both M and $\max_k\{M-p(k)+l(k)\}$ are lower bounds on an optimal solution, the algorithm gives a 3-approximation.

Figure 6:
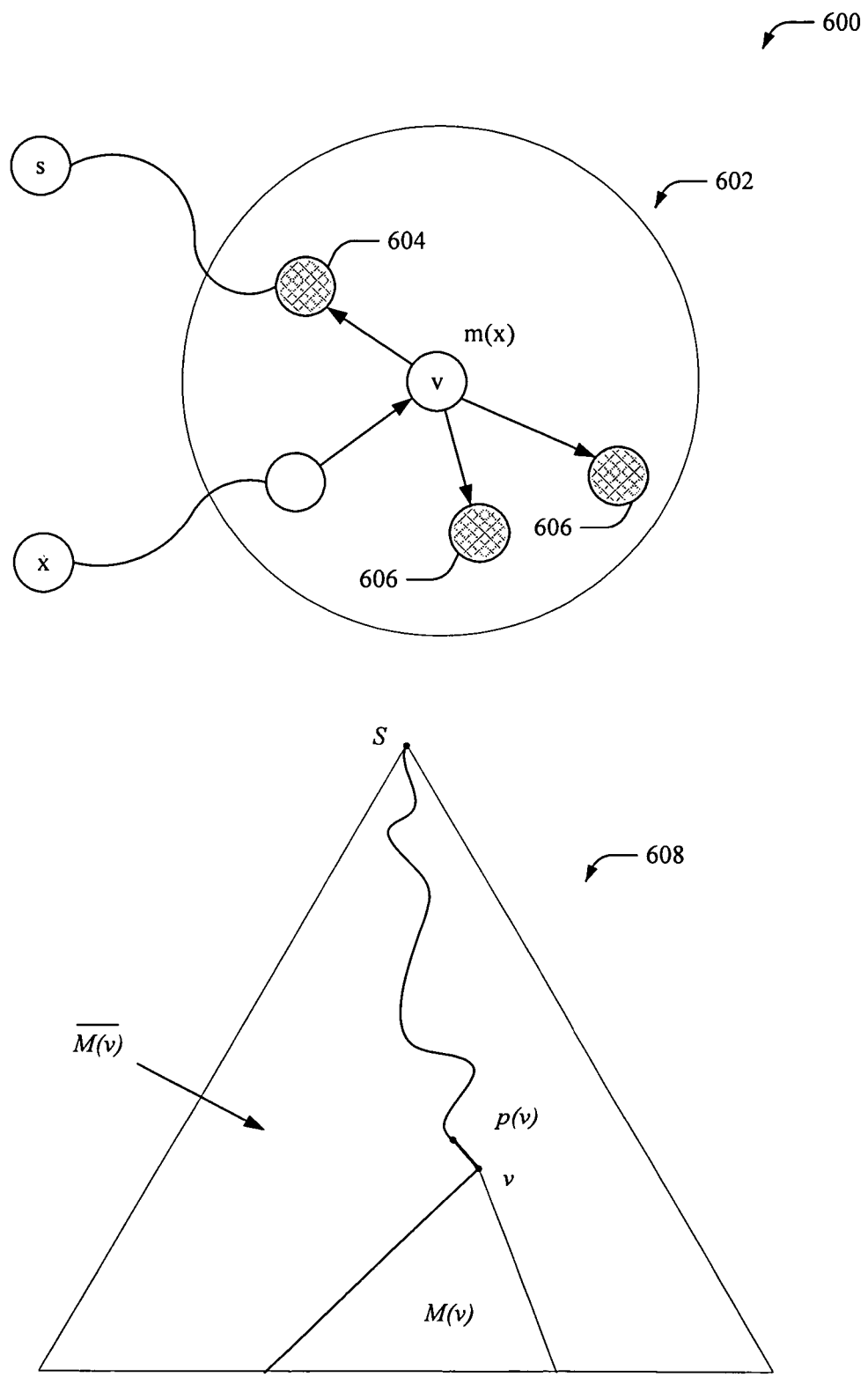
FIG. 6 illustrates example schematic diagrams that depict an all-to-all broadcast scheme that can minimize latency without affecting a set of theoretical bound associated with a broadcast algorithm in accordance with an aspect of the disclosed subject matter.

Referring now to FIG. 6, there illustrated are example schematic diagrams 600 that depict an all-to-all broadcast scheme that can minimize latency without affecting a set of theoretical bound associated with broadcast algorithms in accordance with an aspect of the disclosed subject matter. Network 602 illustrates an all-to-all broadcast scheme that can optimize a transmission schedule (e.g. by a scheduling component 204) of a broadcast algorithm in a manner to avoid collisions and reduce latency without affecting theoretical bounds associated with the algorithm. During all-to-all broadcast, each node v in the network 602 can have a message m(v) to send to all other nodes. The network 602 can employ an optimization component 102 (not shown) that can input a UDG, G=(V, E), and construct a broadcast tree $T_b$. Further, the optimization component (102 in FIG. 1) can select a root node s, such that, the height of the broadcast tree $T_b$ can be minimized as described supra. During broadcast, a child u of v in the broadcast tree can be responsible for relaying messages received from its subtree to v collision free, and v can be responsible for sending remaining messages to u. In conventional systems, typically, messages can be first sent to the root node s in a broadcast tree, and then s can send the messages one by one to each node by employing a one-to-all broadcast scheme. However, with this traditional approach, when s sends a message, it has to wait until all nodes in L3 receive the message before sending another message to avoid collision. Further, until s receives all the messages and starts propagating them, most nodes are idle, and thus broadcast time can be significantly increased.

Referring back to network 602, the approach employed by the network 602 by utilizing, for example, an optimization component (102 in FIG. 1), enables each node in the network 602 to participate in broadcasting as soon as possible, such that, broadcast time can be minimized. For example, in network 602, node v can receive a message m(x) from node x. Further, node v can transmit the message m(x) to its parent 604 to deliver the message to s. According to an aspect, the node v can also transmit the message m(x) to its children 606 when the message m(x) is transmitted to the parent 604. Thus, the children 606 of v can receive the message m(x) and can initiate broadcasting m(x) in their subtrees in parallel. In one example, a worst-case approximation guarantee of the scheme employed by network 602 can be 23¼.

Referring to network 608 wherein, p(v) can be the parent of node v in broadcast tree $T_b$. Further, S(v) can be the subtree rooted at v. Furthermore, m(v) can be the message that v can have initially and accordingly $M(v)=\cup_{u \in S(v)}\{m(u)\}$. As seen from network 608, $\overline{M(v)}$ can be $M(s) \backslash M(v)$. In one aspect, transmission of a message m from a node v can be considered as an upward transmission, when the message m is from the descendant of v (e.g., $m \in M(v)$). Further, a transmission can be considered as a downward transmission when, for example, $m \in \overline{M(v)}$. In accordance with an embodiment, during an upward transmission of a message, a node can ensure that its parent and each of its children (except the one that sent the message to v) can receive the message. During a downward transmission of a message, the node v can be responsible for sending the message to all of its children.

Figure 7:
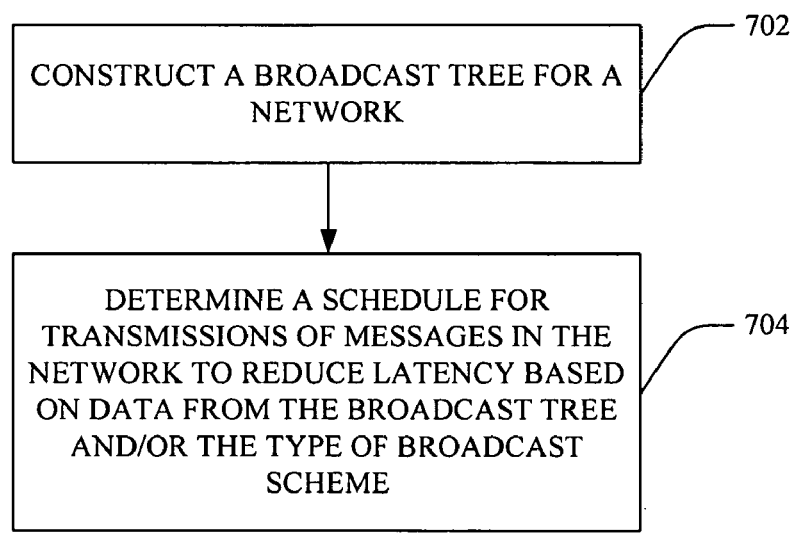
FIG. 7 illustrates an example methodology that can be employed to minimize broadcast latency and optimize practical performance of a network without affecting theoretical bounds of broadcast algorithms, according to an aspect of the disclosed subject innovation.
Figure 8:
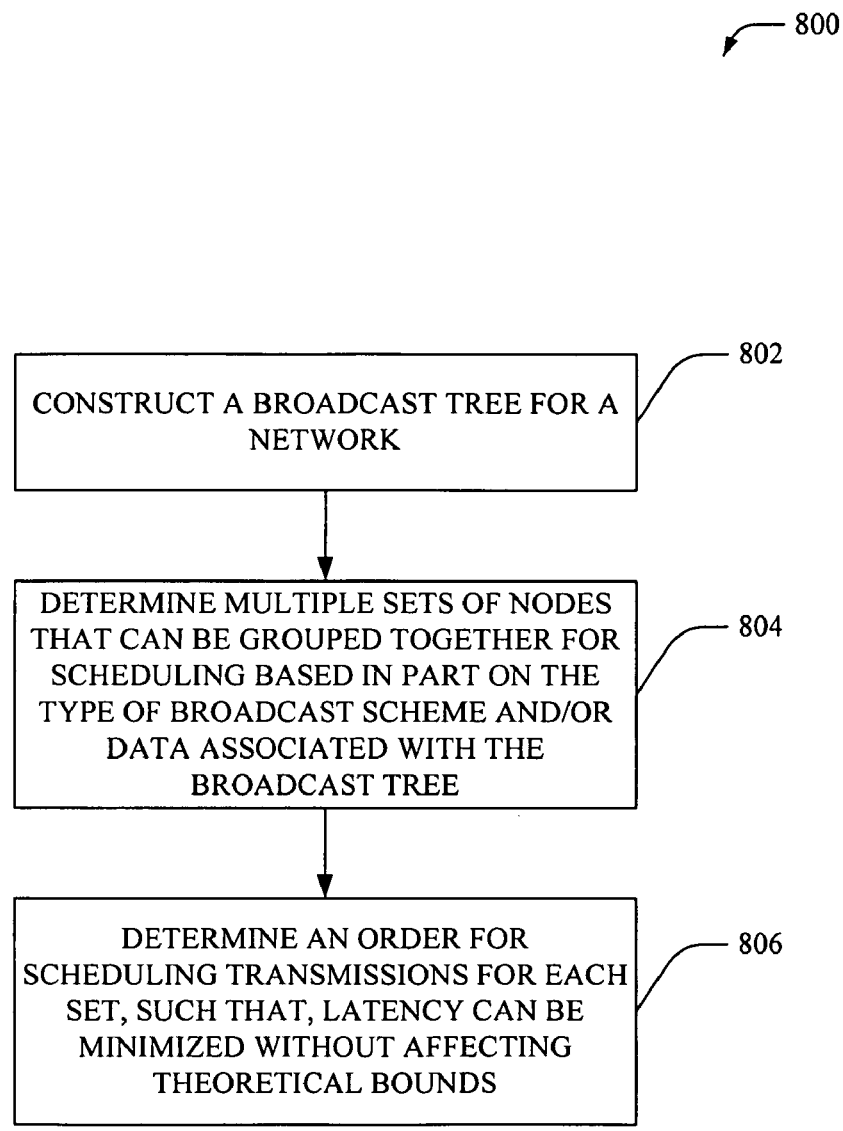
FIG. 8 illustrates an example methodology that can be employed to determine a schedule for message transmissions that can reduce latency in broadcast networks, according to an aspect of the subject innovation.
Figure 9:
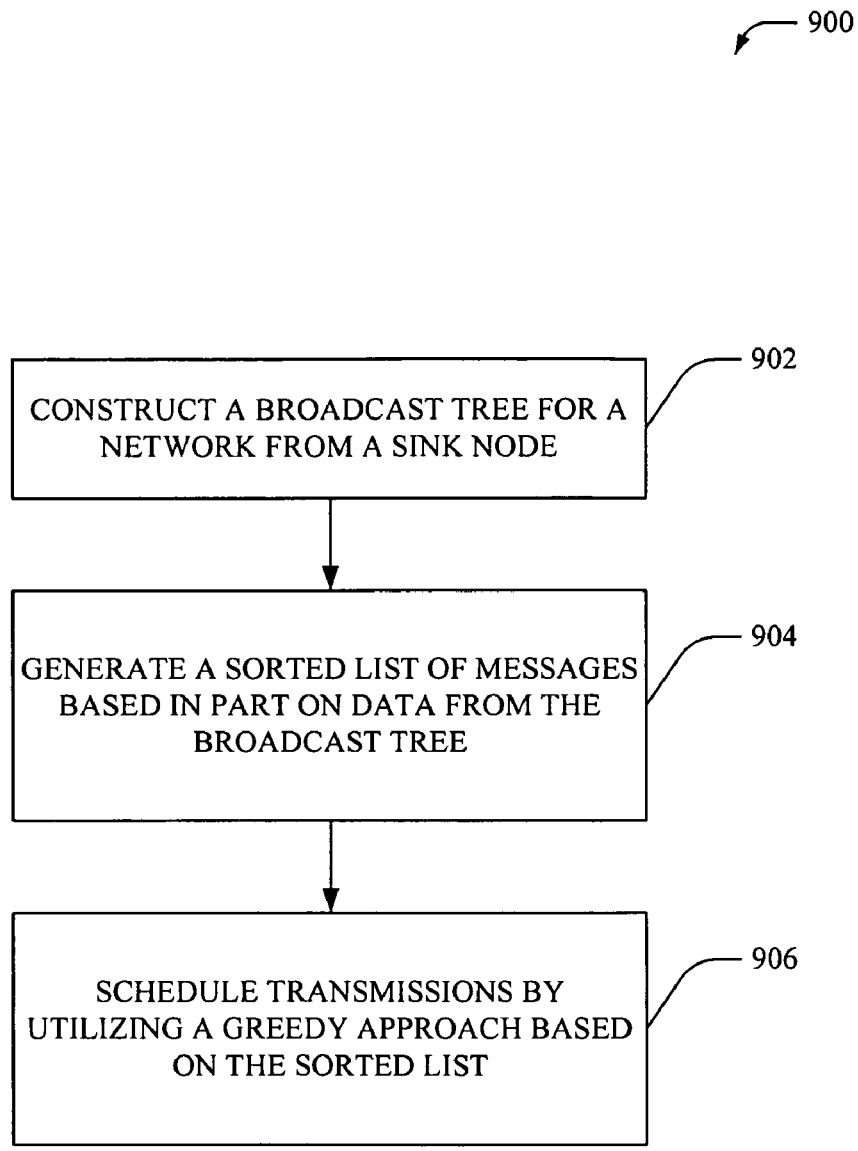
FIG. 9 illustrates an example methodology that can minimize latency during all-to-one data collection in accordance with an aspect of the subject innovation.

FIGS. 7-9 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIG. 7, illustrated is an example methodology 700 that can be employed to minimize broadcast latency and optimize practical performance of a network without affecting theoretical bounds associated with a broadcast algorithm, according to an aspect of the disclosed subject innovation. Typically, the network can be a multihop wireless network. At 702, a broadcast tree can be constructed based in part on the network data. As an example, the broadcast tree can be a BFS (breadth first search) tree. Moreover, the broadcast tree can be utilized in a manner to prevent collisions at a node in the network. In one aspect, a UDG, G=(V, E), and a node s associated with the network can be input and a broadcast tree, rooted at s, can be built by employing most any tree construction technique. Moreover, the node s can be a source node (during one-to-all broadcast), a sink node (during one-to-all collection) or can be a node in the network that builds a tree with a minimum height (during all-to-all broadcast). In addition, the tree can be built in a manner, such that, when a node u is a parent of a node w then u is responsible for transmitting the message to w without a collision at w.

Further, at 704, a broadcast schedule for transmissions of messages at each node in the network can be determined. According to an aspect, the broadcast schedule can reduce latency, redundancy and/or collisions in the network without affecting a theoretical worst case bound. In addition, a node can be enabled to transmit a message more than once in the schedule. It can be appreciated that the schedule can be based on the type of broadcast, for example, one-to-all, all-to-all or all-to-one. In one example, the broadcast schedule can enable each node in the network to participate in broadcasting as soon as possible, such that, when a node transmits a message to its parent to deliver the message to a source node, the children of the node can also receive the message and they can initiate broadcasting the message in their subtrees in parallel. In another example, during data collection, the schedule for messages to be transmitted to a sink node can be based in part on a priority associated with the message.

FIG. 8 illustrates an example methodology 800 that can be employed to determine a schedule for message transmissions that can reduce latency in broadcast networks, according to an aspect of the subject innovation. Typically, the broadcast network can be a multihop wireless network that can employ a one-to-all and/or all-to-all broadcast scheme. At 802, a broadcast tree can be constructed based on data associated with the network. In one example, during all-to-all broadcasting, a root node s can be selected, such that, the height of the broadcast tree is minimized.

At 804, multiple sets of nodes that can be grouped together for scheduling transmissions during a time slot can be determined based in part on the type of broadcast scheme and/or data associated with the broadcast tree. For example, a set X of primary nodes and/or non-leaf secondary nodes can be identified from the broadcast tree. At 806, an order for scheduling transmissions for each set can be determined such that the order reduces latency without affecting theoretical bounds associated with a broadcast algorithm. As an example, during one-to-all broadcast, the transmissions can be scheduled in two phases, such that, in the first phase, transmissions only to the nodes in the set X can be schedules and in the second phase, transmissions to send the message to the remaining nodes can be scheduled. Thus, during one-to-all broadcast, the transmit times of each node can be specified at most twice, once in each phase. As another example, during all-to-all broadcast, a superstep can be introduced, such that, the schedule can enable each node to transmits at most one message if there is a message that the node has received but not sent. During all-to-all broadcast, the order of transmissions can be determined based in part on the following rules: (Rule 1) considering primary nodes first and then scheduling secondary nodes; (Rule 2) determining the order of scheduling primary nodes as follows: A square of G, denoted as $G^2$, is a graph where there is an edge between node u and v if their distance in G is at most 2. $G^2$ [P] can be the induced subgraph of $G^2$ by primary nodes. Accordingly, primary nodes can be considered in a non-increasing order of their degrees in $G^2$ [P] (e.g. smallest degree-last ordering); and, (Rule 3) determining the order of scheduling secondary nodes, such that, the nodes can be considered in the order of their depth in the broadcast tree (e.g. considering the root node first). Among nodes at the same depth, the nodes having a message for upward transmission can be considered first. Additionally, an order in which each node can perform either upward or downward transmission can also be determined.

Referring to FIG. 9, there illustrated is an example methodology 900 that can minimize latency during all-to-one data collection in accordance with an aspect of the subject innovation. At 902, a broadcast tree can be constructed for a multihop wireless network from a sink node. In one example, the broadcast tree can be a BFS tree. At 904, a sorted list of messages can be generated based in part on data from the broadcast tree. For example, messages can be sorted in non-decreasing order of the level of the node sending the message in the broadcast tree, such that, messages that originate from nodes closer to the sink node can appear first in the sorted list.

At 906, transmissions can be scheduled for the messages based in part on the sorted list by utilizing a greedy approach, such that latency can be minimized without affecting theoretical bounds associated with a broadcast algorithm employed by the network. As an example, priority can be given to a message j over most any message i, when message j is listed before message i in the sorted list. Thus, the messages can be ordered based on a priority, and the transmissions of the messages can be scheduled based on the order.

Figure 10:
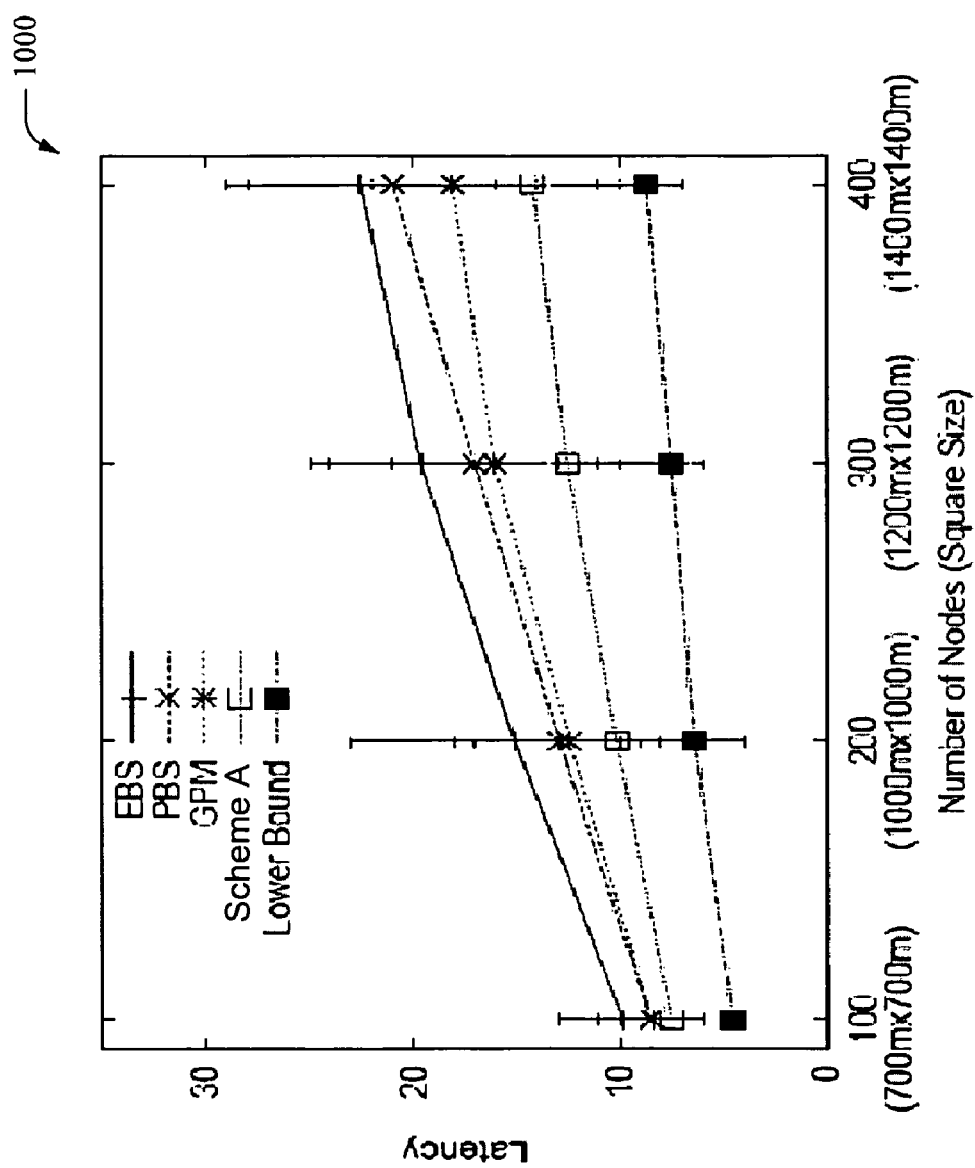
FIG. 10 illustrates an example graph that depicts an average broadcast latency that can be achieved by employing an optimization technique that improves practical performance of a network, in accordance with an aspect of the disclosure.

Referring now to FIG. 10, there illustrated is an example graph 1000 that depicts an average broadcast latency that can be achieved by employing an optimization technique that improves practical performance of a network, in accordance with an aspect of the disclosure. In one example, wireless nodes can be placed in a square (e.g., 1000 m by 1000 m) uniformly at random and the number of nodes and/or the size of square can be varied. During, one-to-all broadcast, a source node can be the root of broadcast tree created, for example by the tree construction component (202 in FIG. 2). During, all-to-all broadcast, each node can be a source and can send one message each. The tree construction component (202 in FIG. 2) can construct a broadcast tree for each node as the root and select the one with minimum height.

The graph 1000 can compare the broadcast latency that occurs after optimization (e.g. by the optimization component 102) with conventional schemes. GPM (scheme presented by R. Gandhi, S. Parthasarathy, and A. Mishra, "Minimizing broadcast latency and redundancy in ad hoc networks," in *Proceedings of the 4th ACM International Symposium on Mobile Ad Hoc Networking and Computing, MobiHoc 2003*, 2003, pp. 222-232) represents a conventional one-to-all algorithm and MSB represents a conventional all-to-all algorithm. In MSB, each node can create its own broadcast tree and schedule transmissions greedily. The graph 1000 further depicts an Enhanced Broadcast Scheduling (EBS) and Pipelined Broadcast Scheduling (PBS) employed by conventional systems (presented by S. Huang, P. Wan, X. Jia, H. Du, and W. Shang, "Minimum-latency broadcast scheduling in wireless ad hoc networks," in *Proceedings of the 26th IEEE International Conference on Computer Communications, INFOCOM 2007*, 2007, pp. 733-739). Similar to GPM, EBS can handle one level in a BFS tree at a time. PBS can first send a message to all nodes in a maximal independent set (MIS) along a shortest-path tree and in a second phase, PBS can schedule the nodes in the MIS to transmit to their neighbors.

The optimization heuristics employed by the subject network (104 in FIG. 1) do not affect the worst-case bound, while significantly improving practical performance. Specifically, PBS can be optimized by the optimization component (102 in FIG. 1), such that, a node in MIS does not transmit if all its neighbors have received the message from a transmission in the first phase. Further, although both EBS and PBS can utilize $C^2$ to find independent sets that correspond to units of simultaneous transmissions (e.g., in the second phase of PBS), the optimization component (102 in FIG. 1) can significantly improve the performance by employing a carefully chosen subgraph when finding the independent sets. In EBS, at each level, secondary nodes are scheduled strictly after primary nodes. However, the optimization component (102 in FIG. 1) can further optimize EBS by allowing secondary nodes to transmit opportunistically at the same slots as primary nodes when they do not interfere with the primary nodes.

The graph 1000 depicts the average values of latency for broadcast schemes as well as the height of a broadcast tree (for example, a lower bound). The scheme employed by utilizing the optimization component (102 in FIG. 1) is depicted as scheme A in graph 1000. It can be noted from the figure, that scheme A can consistently outperform existing conventional schemes by 11-37%. Specifically, in the 400-node scenario, the average latency of scheme A can be is 14.2, while the lower bound is 8.7 (such that, approximation ratio is around 1.64). Thus, scheme A can be around 21% better than GPM (18.1), 32% better than PBS (21.0), and 37% better than EBS (22.5). In contrast with the EBS scheme, in scheme A, primary nodes and secondary nodes at the same level can be scheduled at a same time slot and thus latency can be reduced. Further, PBS can perform similar to GPM, and its asymptotic ratio does not directly translate to good performance in practice. While the broadcast tree height increases as the square size increases, scheme A can maintain the approximation ratio around 1.65. As depicted in the graph 1000, the performance of scheme A in practice is much closer to optimal than that of the conventional schemes. It can be appreciated that scheme A can outperform conventional schemes, when settings, such as, but not limited to, different node density are varied. Further, as seen from graph 1000, scheme A has the closest performance to the lower bound (theoretical bound).

In addition, despite some nodes possibly transmitting up to twice during one-to-all broadcasting in scheme A, the average number of transmissions compared to that of GPM is substantially similar (less than 6% difference in all cases). The number of transmissions by EBS is similar to scheme A, and PBS sends 13-22% more transmissions than GPM. For example, when there are 200 nodes in 1000 m-by-1000 m square, GPM on average transmits 32.8 times, scheme A transmits 33.2 times, EBS transmits 34.0 times, and PBS transmits 37.3 times. In this example, among the 33.2 transmissions for scheme A, on average 27.2 nodes can transmit once, and only 3.0 nodes can transmit twice. However, in PBS, 2.8 out of around 34.5 transmitting nodes can transmit twice on average in this scenario.

Figure 11:
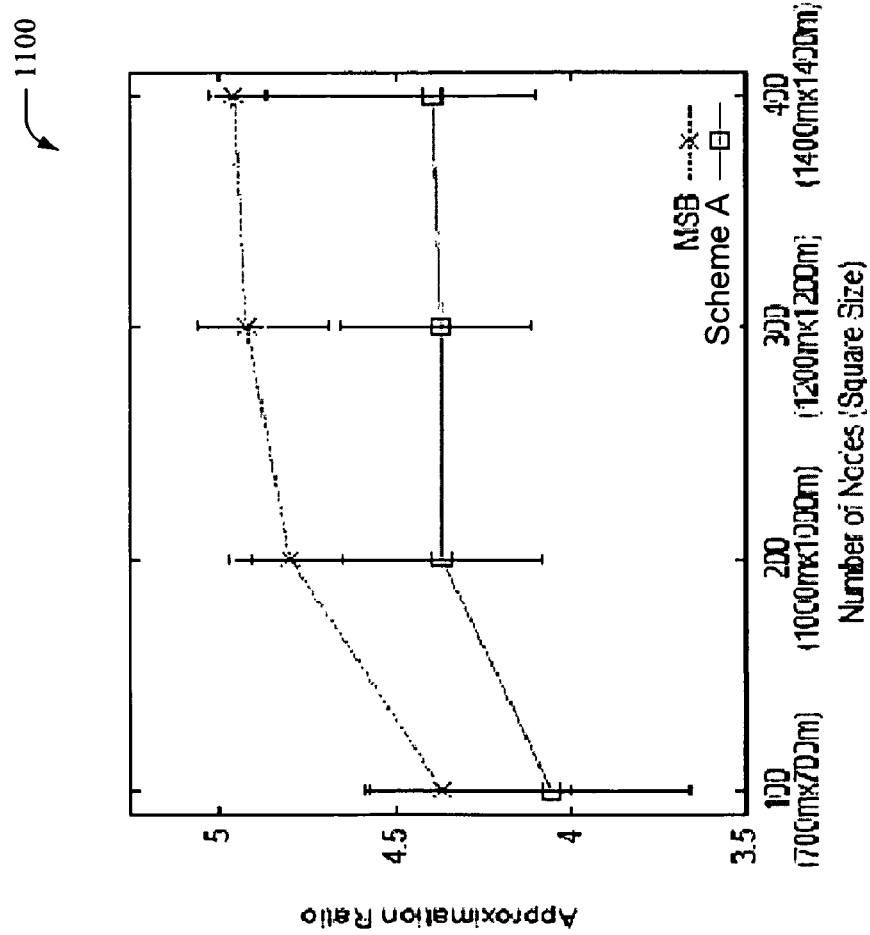
FIG. 11 illustrates an example graph that depicts an average approximation ratio during all-to-all broadcast achieved by employing an optimization technique, according to an aspect of the disclosure.

Referring to FIG. 11, there illustrated is an example graph 1100 that depicts an average approximation ratio during all-to-all broadcast achieved by employing an optimization technique, according to an aspect of the disclosure. Specifically, the optimization technique employed (e.g. by optimization component 102) can employ two optimization heuristics for an all-to-all broadcast scheme. First, specific nodes can be enabled to transmit multiple times in a superstep, as long as the transmission does not affect the worst-case bound. As an example, as many nodes in Q as possible can be scheduled at each time slot. Therefore, for example, if Q has only one node v at some time t, other nodes can be scheduled only after (i) Q becomes empty after v is scheduled at the end of time t, and (ii) a new Q can be obtained with more nodes available at time t+1. In this scenario, the time slot t can be wasted since other nodes (not in Q) that could send messages without conflicts, cannot be scheduled. However, by employing scheme A (e.g. employed by optimization component 102), a subset of nodes not in Q can be scheduled if possible. Secondly, scheme A can allow a node to receive messages from non-tree neighbors if it hears a message collision-free even when a transmitter is not its tree-neighbor in the broadcast tree. Thus, scheme A can potentially eliminate some of transmissions from its tree-neighbors to the node, decreasing the total broadcast time.

As seen from graph 1100, the average approximation ratio of scheme A during all-to-all broadcast scheme and MSB can be compared while varying the number of nodes and the square size. Although the approximation ratio in scheme A slightly increases as the network becomes larger, scheme A consistently outperforms MSB by 7-11%. Further, the performance of scheme A in practice is much better than the analytical bound of 23.25. In one example, with 200 nodes in 1000 m-by-1000 m square, scheme A can employ around 870 time units (or approximation ratio of 4.36) to complete the broadcast of 200 messages, while MSB can employ around 960 time units (or approximation ratio of 4.80). Thus, as seen from graph 1100 the optimization heuristics employed in scheme A can reduce the number of transmissions. Further, in terms of transmission overhead, scheme A can consistently employ fewer transmissions than MSB (by 13-16% depending on the scenarios).

Figure 12:
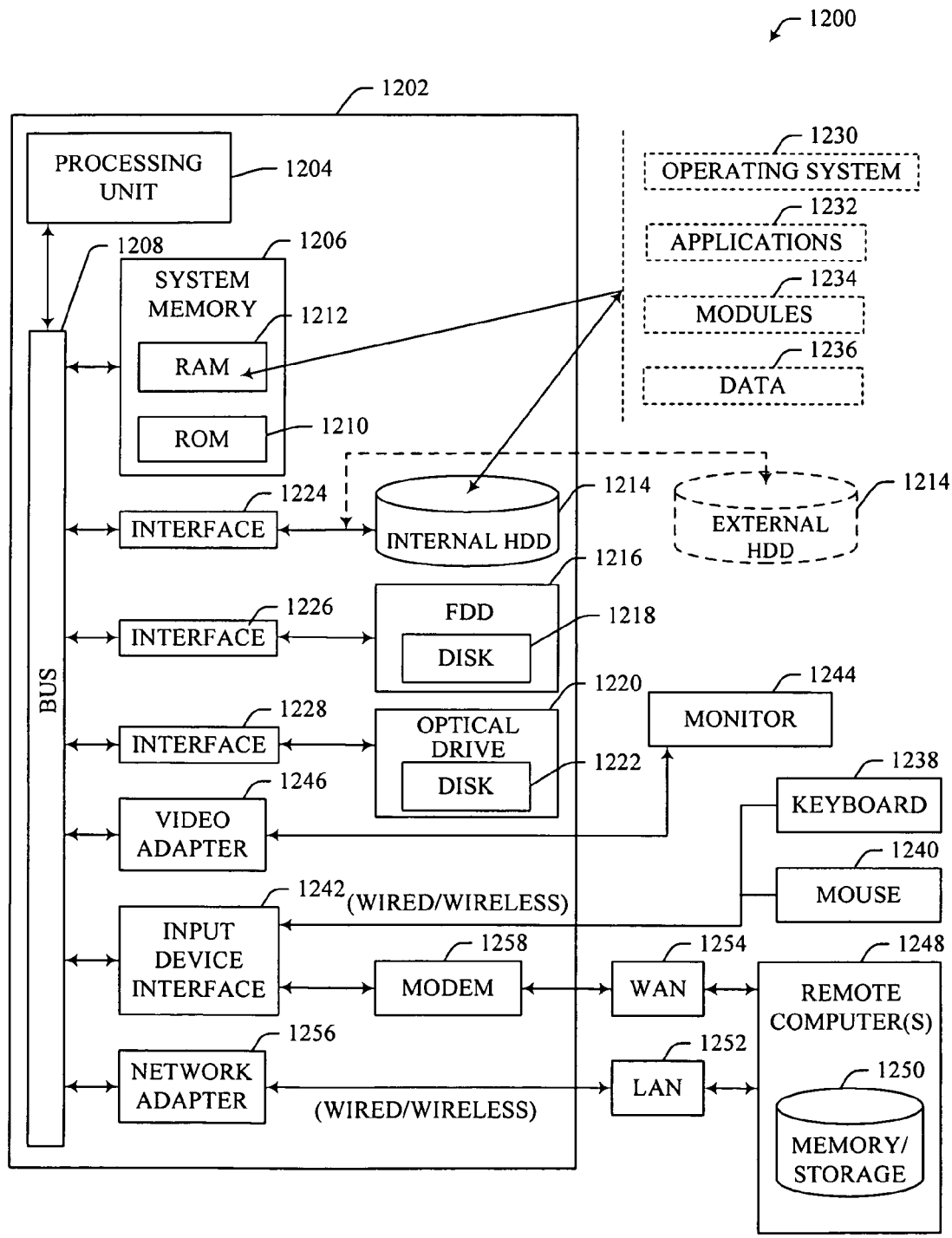
FIG. 12 illustrates a schematic block diagram depicting a suitable operating environment in accordance with an aspect of the subject innovation.

Referring now to FIG. 12, there is illustrated a block diagram of a computer operable to execute the disclosed architecture facilitates optimization of practical performance in broadcast scheduling in. In order to provide additional context for various aspects of the subject specification, FIG. 12 and the following discussion are intended to provide a brief, general description of a suitable computing environment 1200 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the example environment 1200 for implementing various aspects of the specification includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates optimizing practical performance of broadcast schemes in a multihop wireless network, comprising:
    at least one processor; and
    at least one memory, communicatively coupled to the at least one processor, containing computer executable instructions configured to facilitate operation of the system, the instructions comprising:
        a tree construction component configured to generate at least one breadth-first search (BFS) tree based on data from the multihop wireless network;
        a node classification component configured to identify one or more sets of nodes that can transmit messages in a time slot, based at least in part on the at least one BFS tree; and
        an optimization component configured to determine, based at least in part on the at least one BFS tree, a schedule for message transmission in the multihop wireless network to minimize latency, the schedule enables the one or more sets of nodes in the multihop wireless network to transmit messages during the time slot without interfering with one or more transmissions scheduled based in part on a broadcast algorithm in the time slot.

2. The system of claim 1, the instructions further comprising, a scheduling component configured to specify at least one of a time at which a node of the one or more sets of nodes receives a message collision-free or a time at which the node transmits the message.

3. The system of claim 2, wherein the scheduling component is further configured to schedule transmissions to a set of primary nodes and non-leaf secondary nodes in a broadcast tree associated with the multihop wireless network in a first phase and schedules transmissions to send the message to one or more disparate nodes in the broadcast tree excluded from the set.

4. The system of claim 3, wherein the scheduling component is further configured to determine an order of transmissions for an all-to-all broadcast based on at least one of an analysis of primary nodes prior to scheduling secondary nodes, an analysis of the primary nodes in a non-increasing order of respective degrees in $G^2$, or an analysis of secondary nodes in order of respective depth in a broadcast tree associated with the multihop wireless network, wherein $G^2$ is a graph representing an edge between two nodes representing a distance in $G$ of at most 2 and wherein $G^2$ is an induced subgraph of $G^2$ by primary nodes.

5. The system of claim 2, wherein the scheduling component is further configured to determine an order of transmissions for an all-to-one collection including arranging messages based on a priority, yielding an arrangement, and further configured to schedule transmission of the messages based at least in part on the arrangement.

6. The system of claim 1, the instructions further comprising, a message sorting component configured to generate a sorted list of messages in a non-decreasing order of a level of a node in the at least one BFS tree that transmits each message.

7. The system of claim 1, the instructions further comprising:
    a broadcast tree construction component configured to construct a broadcast tree.

8. The system of claim 7, wherein the optimization component is configured to determine the schedule based at least in part on the broadcast tree.

9. The system of claim 7, further comprising:
    a message component configured to generate a sorted list of messages based at least in part on the broadcast tree; and
    a transmission component configured to schedule transmission of the messages based at least in part on the sorted list.

10. A method for reducing latency associated with broadcast schemes in a multihop wireless network comprising:
    constructing at least one breadth-first search (BFS) tree based on data from the multihop wireless network;
    identifying a set of nodes in the multihop wireless network that transmit messages scheduled based on a broadcast algorithm during a time slot, based at least in part on the at least one BFS tree; and
    determining a disparate schedule for transmission, based at least in part on the at least one BFS tree, that enables a disparate set of nodes in the multihop wireless network to transmit messages during the time slot without interfering with a transmission by the identified set of nodes.

11. The method of claim 10, further comprising, scheduling transmission of messages from the set of nodes and the disparate set of nodes during the time slot to reduce latency.

12. The method of claim 10, further comprising, constructing a broadcast tree based in part on at least one of a broadcast scheme or data associated with the multihop wireless network, the broadcast tree employed to determine the disparate schedule.

13. The method of claim 10, further comprising, scheduling each node in the multihop wireless network to transmit a message to one or more children nodes when the node transmits the message to a parent node that delivers the message to a source node, the one or more children nodes initiate broadcasting the message in respective subtrees of the respective one or more children nodes in parallel.

14. The method of claim 10, further comprising, determining a schedule to transmit messages to a sink node during all-to-one collection, based in part on a priority associated with the messages.

15. The method of claim 10, wherein, the determining a disparate schedule includes minimizing at least one of latency, redundancy or collisions.

16. A system that optimizes a message transmission schedule for a broadcast scheme in a multihop wireless network, comprising:

means for constructing at least one breadth-first search (BFS) tree based on data from the multihop wireless network;

means for determining one or more sets of nodes, based at least in part on the BFS tree, that can transmit in a time slot;

means for generating a schedule for message transmission that enables the one or more sets of nodes in the multihop wireless network to transmit messages during the time slot without interfering with one or more transmissions scheduled in the timeslot time slot based in part on a broadcast algorithm, the schedule is based at least in part on the at least one BFS tree; and means for transmitting the messages based in part on the generated schedule.

17. The system of claim 16, further comprising, means for determining at least one of a time at which a node receives a message collision-free or a time at which the node transmits the message.

18. The system of claim 16, further comprising, means for identifying multiple sets of nodes in the multihop wireless network that are grouped together for scheduling transmissions during the time slot based in part on at least one of the broadcast algorithm or data associated with the BFS tree.

19. The system of claim 16, further comprising, means for determining a schedule for messages to be transmitted to a sink node during all-to-one collection, based in part on a priority associated with the messages.

20. The system of claim 16, further comprising, means for scheduling a node in the multihop wireless network to transmit a message to one or more children nodes when the node transmits the message to a parent node that delivers the message to a source node, the one or more children nodes initiate broadcasting the message in respective subtrees of the respective one or more children nodes in parallel.

* * * * *